United States Patent
Rafii

(10) Patent No.: US 10,698,948 B2
(45) Date of Patent: *Jun. 30, 2020

(54) AUDIO MATCHING BASED ON HARMONOGRAM

(71) Applicant: Gracenote, Inc., Emeryville, CA (US)

(72) Inventor: Zafar Rafii, Berkeley, CA (US)

(73) Assignee: GRACENOTE, INC., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/403,202

(22) Filed: May 3, 2019

(65) Prior Publication Data

US 2019/0258668 A1 Aug. 22, 2019

Related U.S. Application Data

(63) Continuation of application No. 15/298,601, filed on Oct. 20, 2016, now Pat. No. 10,282,471, which is a
(Continued)

(51) Int. Cl.
*G06F 17/00* (2019.01)
*G06F 16/632* (2019.01)
(Continued)

(52) U.S. Cl.
CPC ........ *G06F 16/632* (2019.01); *G06F 16/2255* (2019.01); *G06F 16/61* (2019.01);
(Continued)

(58) Field of Classification Search
CPC .... G06F 16/2255; G06F 16/61; G06F 16/632; G06F 16/683; G10H 2210/066;
(Continued)

(56) References Cited

U.S. PATENT DOCUMENTS 8,447,041 B2  5/2013 Asada et al.
8,843,377 B2  9/2014 Lemons
(Continued)

FOREIGN PATENT DOCUMENTS

WO  2005101243  10/2005
WO  2016109500  7/2016

OTHER PUBLICATIONS

United States Patent and Trademark Office, "Notice of Allowance," issued in connection with U.S. Appl. No. 14/980,622, dated Jul. 29, 2016, 14 pages.
(Continued)

*Primary Examiner* — Paul C McCord
(74) *Attorney, Agent, or Firm* — Hanley, Flight & Zimmerman, LLC

(57) ABSTRACT

In an example context of identifying live audio, an audio processor machine accesses audio data that represents a query sound and creates a spectrogram from the audio data. Each segment of the spectrogram represents a different time slice in the query sound. For each time slice, the audio processor machine determines one or more dominant frequencies and an aggregate energy value that represents a combination of all the energy for that dominant frequency and its harmonics. The machine creates a harmonogram by representing these aggregate energy values at these dominant frequencies in each time slice. The harmonogram thus may represent the strongest harmonic components within the query sound. The machine can identify the query sound by comparing its harmonogram to other harmonograms of other sounds and may respond to a user's submission of the query sound by providing an identifier of the query sound to the user.

20 Claims, 12 Drawing Sheets

Related U.S. Application Data continuation of application No. 14/980,622, filed on Dec. 28, 2015, now Pat. No. 9,501,568.

(60) Provisional application No. 62/099,399, filed on Jan. 2, 2015.

(51) Int. Cl.

| | | |
|---|---|---|
| *G06F 16/61* | (2019.01) | |
| *G06F 16/683* | (2019.01) | |
| *G06F 16/22* | (2019.01) | |
| *G10L 25/18* | (2013.01) | |
| *G10L 25/21* | (2013.01) | |
| *G10L 25/45* | (2013.01) | |
| *G10L 25/54* | (2013.01) | |
| *G10L 25/72* | (2013.01) | |

(52) U.S. Cl.
CPC ............ *G06F 16/683* (2019.01); *G10L 25/18* (2013.01); *G10L 25/21* (2013.01); *G10L 25/45* (2013.01); *G10L 25/54* (2013.01); *G10L 25/72* (2013.01); *G10H 2210/066* (2013.01); *G10H 2240/141* (2013.01); *G10H 2250/031* (2013.01)

(58) Field of Classification Search
CPC ........ G10H 2240/141; G10H 2250/031; G10L 25/18; G10L 25/21; G10L 25/45; G10L 25/54; G10L 25/72
USPC .......................................................... 700/94
See application file for complete search history.

(56) References Cited

U.S. PATENT DOCUMENTS

| | | | |
|---|---|---|---|
| 9,280,943 | B2 | 3/2016 | Kimpe et al. |
| 9,280,961 | B2 | 3/2016 | Eronen et al. |
| 9,501,568 | B2 | 11/2016 | Rafii |
| 2003/0231775 | A1 | 12/2003 | Wark |
| 2005/0234366 | A1 | 10/2005 | Heinz et al. |
| 2006/0075884 | A1 | 4/2006 | Streitenberger et al. |
| 2007/0157795 | A1 | 7/2007 | Hung |
| 2009/0265024 | A1 | 10/2009 | Dittmar et al. |
| 2009/0287323 | A1 | 11/2009 | Kobayashi |
| 2011/0066390 | A1 | 3/2011 | Macleod et al. |
| 2011/0286618 | A1 | 11/2011 | Vandali et al. |
| 2013/0191088 | A1 | 7/2013 | Wells et al. |
| 2013/0282369 | A1 | 10/2013 | Visser et al. |
| 2014/0108020 | A1 | 4/2014 | Sharma et al. |
| 2014/0180673 | A1 | 6/2014 | Neuhauser et al. |
| 2014/0280265 | A1 | 9/2014 | Wang et al. |
| 2014/0280304 | A1 | 9/2014 | Scherf et al. |
| 2014/0330556 | A1 | 11/2014 | Resch et al. |
| 2016/0196343 | A1 | 7/2016 | Rafii |

OTHER PUBLICATIONS

United States Patent and Trademark Office, "Notice of Allowance," issued in connection with U.S. Appl. No. 15/298,601, dated Dec. 21, 2018, 7 pages.

International Searching Authority, "International Search Report," issued in connection with International Patent Application No. PCT/US2015/067814, dated Feb. 26, 2016, 2 pages.

International Searching Authority, "Written Opinion," issued in connection with International Patent Application No. PCT/US2015/067814, dated Feb. 26, 2016, 4 pages.

International Searching Authority, "International Preliminary Report on Patentability," issued in connection with International Patent Application No. PCT/US2015/067814, dated Jul. 13, 2017, 6 pages.

Baluja et al., "Audio Fingerprinting: Combining Computer Vision & Data Stream Processing," 32nd International Conference on Acoustics, Speech and Signal Processing, Honolulu, HI, USA, (Apr. 2007), pp. II-213-II-216, 4 pages.

Bardeli et al., "Robust Identification of Time-Scaled Audio," AES 25th International Conference, London, United Kingdom, Jun. 2004, 12 pages.

Bello, Juan Pablo, "Audio-Based Cover Song Retrieval using Approximate Chord Sequences Testing Shifts, Gaps, Swaps and Beat," 8th International Conference on Music Information Retrieval, Vienna, Austria, (Sep. 2007), 6 pages.

Bertin-Mahieux et al., "Large-Scale Cover Song Recognition using Hashed Chroma Landmarks," IEEE Workshop on Applications of Signal Processing to Audio and Acoustics, New Paltz, NY, USA, (Oct. 2011), 4 pages.

Brown, Judith C., "An efficient Algorithm for the Calculation of a Constant Q Transform", Journal of the Acoustical Society of America, vol. 92, No. 5, (Nov. 1992), 2698-2701, 4 pages.

Brown, Judith C., "Calculation of a Constant Q Spectral Transform", Journal of the Acoustical Society of America, vol. 89, No. 1, (Jan. 1991), 425-434, 10 pages.

Burges et al., "Distortion Discriminant Analysis for Audio Fingerprinting," IEEE Transactions on Audio, Speech, and Language Processing, vol. 11, No. 3, (May 2003), 165-174, 10 pages.

Cano et al., "A Review of Audio Fingerprinting," Journal of VLSI Signal Processing Systems, vol. 41, No. 3, (Nov. 2005), 271-284, 14 pages.

Charikar et al., "Similarity Estimation Techniques from Rounding Algorithms," Proceedings of the Thirty-Fourth Annual ACM Symposium on Theory of Computing, (May 2002), 9 pages.

Casey et al., "Analysis of Minimum Distances in High-Dimensional Musical Spaces," IEEE Transactions on Audio, Speech, and Language Processing, (Jul. 2008), 1015-1028, 14 pages.

Duda, Richard O., et al., "Use of the Hough transformation to Detect Lines and Curves in Pictures," Communications of the ACM, vol. 15, No. 1, (Jan. 1972), 11-15, 5 pages.

Ellis, Daniel P., "Identifying 'Cover Songs' with Chroma Features and Dynamic Programming Beat Tracking," 32nd International Conference on Acoustics, Speech and Signal Processing, Honolulu, HI, USA, (Apr. 2007), 4 pages.

Fenet et al., "A Scalable Audio Fingerprint Method with Robustness to Pitch-Shifting", 12th International Society for Music Information Retrieval, Miami, FL, USA, (Oct. 2011), 121-126, 6 pages.

Grosche et al., "Audio content-based music retrieval," Multimodal Music Processing, Meinard Müller, Masataka Goto, and Markus Schedl, Eds., vol. 3 of Dagstuhl Follow-Ups, Dagstuhl Publishing, Wadern, Germany, (Apr. 2012), 157-174, 18 pages.

Grosche et al., "Toward musically motivated audio fingerprints," 37th International Conference on Acoustics, Speech and Signal Processing, Kyoto, Japan, (Mar. 2012), p. 93-96, 4 pages.

Haitsma, J., et al., "A Highly Robust Audio Fingerprinting System," 3rd International Conference on Music Information Retrieval, IRCAM-Centre Pompidou, [Online]. Retrieved from the Internet: <http://ismir2002.ismir.net/proceedings/02-fp04-2.pdf>, (Oct. 17, 2002), 9 pages.

Harte et al., "Automatic Chord Recognition Using Quantised Chroma and Harmonic Change Segmentation," ResearchGate (2009), 4 pages.

Ke, Yan, "Computer vision for music identification", IEEE Computer Society Conference on Computer Vision and Pattern Recognition, San Diego, CA, USA, (Jun. 2005), 8 pages.

Kurth, Frank, et al., "Efficient index-based audio matching," IEEE Transactions on Audio, Speech, and Language Processing, vol. 16, No. 2, (Feb. 2008), 382-395, 14 pages.

Muller, Meinard, et al., "Audio matching via chroma-based statistical features," 6th International Conference on Music Information Retrieval, London, UK, (Sep. 2005), 8 pages.

Marolt, Matija, "A mid-level representation for melody-based retrieval in audio collections", IEEE Transactions on Audio, Speech, and Language Processing, vol. 10, No. 8,, (Dec. 2008), 9 pages.

Serra et al., "Audio cover song identification and similarity: Background, approaches, evaluation, and beyond," 32nd International Conference on Acoustics, Speech and Signal Processing, Honolulu, HI, USA, (Apr. 2007), 26 pages.

(56) References Cited

OTHER PUBLICATIONS

Serra et al., "Chroma binary similarity and local alignment applied to cover song identification," IEEE Transactions on Audio, Speech, and Language Processing, vol. 16, No. 6, (Sep. 2005), 14 pages.
Sezgin et al., "Survey over image thresholding techniques and quantitative performance evaluation," Journal of Electronic Imaging, vol. 13, No. 1, (Jan. 2004), 146-165, 23 pages.
Wang "An Industrial-Strength Audio Search Algorithm", Proceedings of the Fourth International Conference on Music Information Retrieval, (Oct. 27, 2003), 7 pages.
Zhu, et al., "A novel audio fingerprinting method robust to time scale modification and pitch shifting," 18th International Conference on Multimedia, Firenze, Italy, (Oct. 2010), 987-990, 4 pages.
Tzanetakis et al. "Automatic musical genre classification of audio signals." IEEE Transactions on speech and audio processing 10.5, 2002: 293-302, 6 pages.
White. "The measurement and definition of amplitude modulations." University of Southampton institute of sound and vibration research, 2012: i-47, 49 pages.

AUDIO MATCHING BASED ON HARMONOGRAM

RELATED APPLICATION

This patent arises from a continuation of U.S. patent application Ser. No. 15/298,601, (Now U.S. Pat. No. 10,282,471), which was filed on Oct. 20, 2016, which arises from a continuation of U.S. patent application Ser. No. 14/980,622, (Now U.S. Pat. No. 9,501,568), which was filed on Dec. 28, 2015, which claims the priority benefit of U.S. Provisional Patent Application Ser. No. 62/099,399, which was filed on Jan. 2, 2015. U.S. patent application Ser. No. 15/298,601, U.S. patent application Ser. No. 14/980,622, and U.S. Provisional Patent Application Ser. No. 62/099,399 are hereby incorporated herein by reference in their entireties. Priority to U.S. patent application Ser. No. 15/298,601, U.S. patent application Ser. No. 14/980,622, and U.S. Provisional Patent Application Ser. No. 62/099,399 are hereby claimed.

TECHNICAL FIELD

The subject matter disclosed herein generally relates to the technical field of special-purpose machines that perform or otherwise facilitate audio processing, including computerized variants of such special-purpose machines and improvements to such variants, and to the technologies by which such special-purpose machines become improved compared to other special-purpose machines that perform or otherwise facilitate audio processing. Specifically, the present disclosure addresses systems and methods to facilitate audio matching based on a harmonogram.

BACKGROUND

A performer may give a live performance (e.g., a concert or other live show) before an audience that includes one or more individuals (e.g., audience members, fans, or concertgoers). For example, a musical soloist (e.g., a singer-songwriter) may perform at a concert before such an audience. As another example, a musical group (e.g., a rock band) may perform at a concert before such an audience. As a further example, a theater troupe (e.g., including actors, dancers, and a choir) may perform a theatrical show before such an audience.

One or more audio pieces (e.g., musical pieces or spoken word pieces) may be performed during a live performance. For example, one or more songs may be performed, and a song may be performed with or without visual accompaniment (e.g., a video, a laser show, or a dance routine). In some situations, the performer of an audio piece is an artist that recorded the audio piece (e.g., as a studio recording or as a live recording). For example, a performer may perform a song that she wrote and recorded herself. In other situations, the performer of an audio piece is different from the artist that recorded the audio piece (e.g., as a studio recording or as a live recording). For example, a performer may perform a cover of a song that was written and recorded by someone else.

A machine may be configured to interact with one or more users to identify audio content. One approach is to configure the machine to perform audio fingerprinting, with an aim towards identifying an audio recording given a sample of it (e.g., the title of a song), by comparing a query fingerprint of the sample against a reference fingerprints stored in a database and attempting to find a match. Audio fingerprinting systems are designed to be robust to audio degradations (e.g., encoding, equalization, noise, etc.). However, such systems aim to identify the same rendition of a song and typically consider cover versions (e.g., live performance by a different artist) to be different songs. Cover identification systems aim at identifying a song given an alternate rendition of it (e.g., live, remaster, or remix). A cover version generally retains the same melody as an original rendition of the song, but differs from the original rendition in other musical aspects (e.g., instrumentation, key, or tempo). However, current cover identification machines aim to identify a cover song given a recording that is full, clean, or both, and are either inoperative or inaccurate when given a short and noisy excerpt (e.g., a brief recording by a smart phone at a concert).

BRIEF DESCRIPTION OF THE DRAWINGS

Some embodiments are illustrated by way of example and not limitation in the figures of the accompanying drawings.

DETAILED DESCRIPTION

Figure 1:
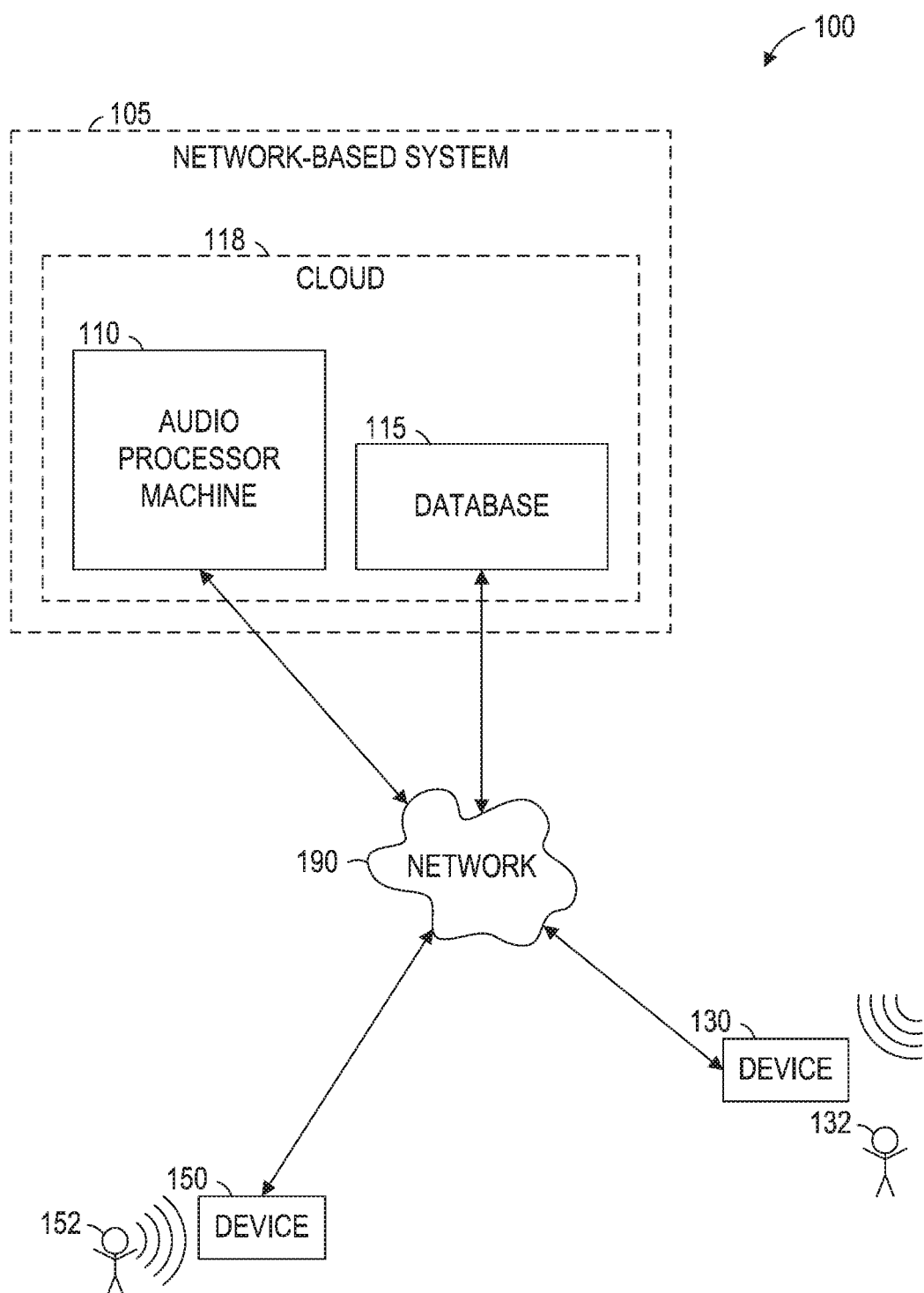
FIG. 1 is a network diagram illustrating a network environment suitable for audio matching based on a harmonogram, according to some example embodiments.

Example methods (e.g., algorithms) facilitate audio matching based on a harmonogram, and example systems (e.g., special-purpose machines) are configured to facilitate audio matching based on a harmonogram. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A machine (e.g., a computer system or other computing device) may be configured (e.g., by software modules) to identify an audio piece, for example, when a live version (e.g., a live cover version) of the audio piece is being performed by performer differently from a reference version (e.g., a studio version or radio version) of the audio piece (e.g., as recorded by the artist that recorded the reference version). The machine may compare a live fingerprint of the segment of the live version against a reference fingerprint of the reference version. The fingerprinting technique used to generate such fingerprints may recognize or otherwise identify one or more core characteristics of the audio piece (e.g., its notes and rhythms) and be robust to differences between the live version and a reference version of the audio piece (e.g., differences in tempo, vocal timbre, vocal strength, vibrato, instrument tuning, ambient noise, reverberation, or distortion). As discussed herein, the fingerprinting technique may be based on a harmonogram (e.g., a modified chromagram or a modified spectrogram) that represents the harmonic structure of the live version (e.g., all harmonics mapped to one octave, such as the octave in which their fundamental frequency lies).

In the example context of identifying live audio, a machine in the example form of an audio processor machine is configured to access audio data that represents a query sound (e.g., query audio, such as a query song). As configured, the machine creates a spectrogram of the audio data. In creating the spectrogram, the machine generates (e.g., in memory) an array of at least two dimensions (e.g., a two-dimensional matrix that may be stored, processed, analyzed, or otherwise treated as an image) that represents energies (e.g., energy values, such as amplitude values or power values) occurring at various frequencies correlated with times at which those energies occur. The spectrogram may be generated by mathematically transforming energy values in time segments of the audio data. Using a constant Q transform (CQT) typically results in a spectrogram that represents frequencies on a log frequency scale, though other transforms (e.g., fast Fourier transform (FFT)) may be used instead (e.g., to obtain a spectrogram that represents frequencies on a linear frequency scale). In some example embodiments, the machine applies a weighting function to the spectrogram in preparation for further processing.

The created spectrogram (e.g., weighted or unweighted) includes multiple segments that each indicate energy values at various frequencies during a different time slice (e.g., a span of 100 milliseconds) within the query sound. Accordingly, each segment of the spectrogram represents a different time slice (e.g., a different overlapping time slice) of the query sound. With the spectrogram created, the machine determines one or more dominant frequencies (e.g., fundamental frequencies) in each time slice. For each dominant frequency, the machine also calculates an aggregate energy value that represents an aggregation of the energy values for that dominant frequency and its harmonics, as represented in the segment of the spectrogram.

The machine creates a harmonogram by representing these aggregate energy values at these dominant frequencies in each time slice. As with the spectrogram, the machine creates the harmonogram by generating (e.g., a memory) an array of at least two dimensions. The array indicates the aggregate energy values at the dominant frequencies correlated with times at which the aggregate energy values occur. However, instead of indicating all energies at all frequencies in the query sound, the harmonogram indicates the combined energies contributed by the most dominant (e.g., most prominent or most humanly hearable) frequencies and their harmonics. Accordingly, the harmonogram can be considered to represent the strongest harmonic components within the query sound (e.g., only the strongest harmonic components).

With the harmonogram created, the machine is configured to identify the query sound by comparing the harmonogram (e.g., a query harmonogram) to other harmonograms (e.g., reference harmonograms) of other sounds (e.g., reference audio, such as reference songs). Thus, the machine can respond to a user's submission of query sound or its harmonogram by providing an identifier of the query sound based on such a comparison. Although many example embodiments of the machine discussed herein operate in the context of identifying live sounds, other example embodiments of the machine are configured to generate, access, compare, and match harmonograms in the course of performing other audio processing tasks. Examples of such other tasks include query-by-humming (e.g., identifying a melody hummed by a user), multi-pitch extraction (e.g., identifying multiple individual musical parts within polyphonic audio content), source separation (e.g., identifying individual sound sources within polyphonic audio content), and any suitable combination thereof.

FIG. 1 is a network diagram illustrating a network environment 100 suitable for audio matching based on a harmonogram, according to some example embodiments. The network environment 100 includes an audio processor machine 110, a database 115, and devices 130 and 150, all communicatively coupled to each other via a network 190. The audio processor machine 110, with or without the database 115, may form all or part of a cloud 118 (e.g., an audio processing cloud in the example form of a geographically distributed set of multiple machines configured to function as a single server to provide audio processing services), which may form all or part of a network-based system 105 (e.g., a cloud-based server system configured to provide one or more network-based audio processing services to the devices 130 and 150). The audio processor machine 110 and the devices 130 and 150 may each be implemented in a special-purpose (e.g., specialized) computer system, in whole or in part, as described below with respect to FIG. 12.

Also shown in FIG. 1 are users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is associated with the device 130 and may be a user of the device 130. For example, the device 130 may be a desktop computer, a vehicle computer, a tablet computer, a navigational device, a portable media device, a smart phone, or a wearable device (e.g., a smart watch, smart glasses, smart clothing, or smart jewelry) belonging to the user 132. Likewise, the user 152 is associated with the device 150 and may be a user of the device 150. As an example, the device 150 may be a desktop computer, a vehicle computer, a tablet computer, a navigational device, a portable media device, a smart phone, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 12, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single machine, and the functions described herein for any single system or machine may be subdivided among multiple systems or machines.

The network 190 may be any network that enables communication between or among systems, machines, databases, and devices (e.g., between the audio processor machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
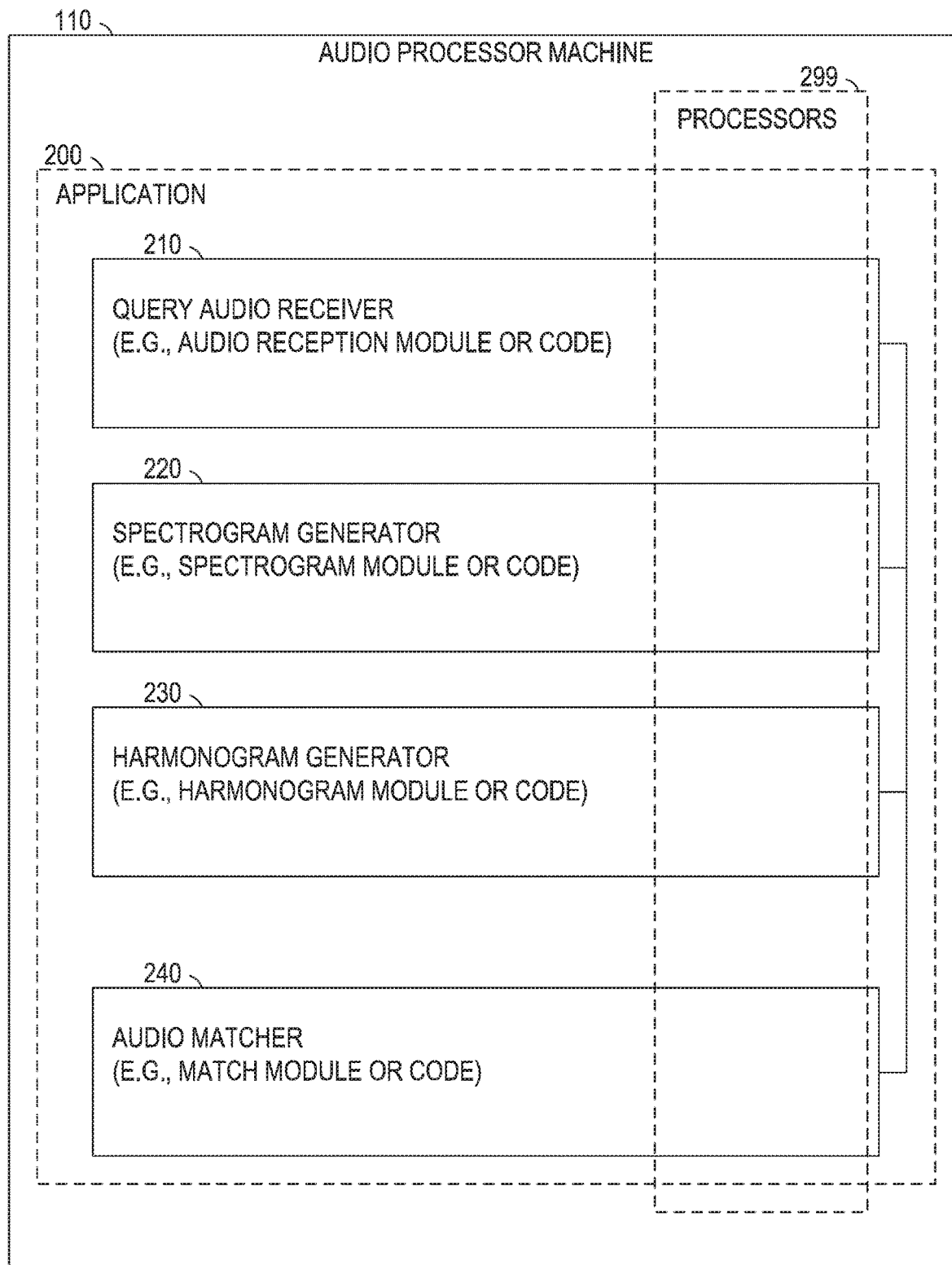
FIG. 2 is a block diagram illustrating components of an audio processor machine suitable for audio matching based on a harmonogram, according to some example embodiments.

FIG. 2 is a block diagram illustrating components of the audio processor machine 110, according to some example embodiments. The audio processor machine 110 is shown as including a query audio receiver 210 (e.g., an audio reception module or audio reception code), a spectrogram generator 220 (e.g., a spectrogram generation module or spectrogram generation code), a harmonogram generator 230 (e.g., a harmonogram generation module or harmonogram generation code), and an audio matcher (e.g., an audio match module for audio matching code) 240, all configured to communicate with each other (e.g., via a bus, shared memory, or a switch).

As shown in FIG. 2, the query audio receiver 210, the spectrogram generator 220, the harmonogram generator 230, and the audio matcher 240 may form all or part of an application 200 (e.g., a server-side application) that is stored (e.g., installed) on the audio processor machine 110 and executable by the audio processor machine 110 by one or more processors 299. Furthermore, the one or more processors 299 (e.g., hardware processors, digital processors, or any suitable combination thereof) may be included (e.g., temporarily or permanently) in the application 200, the query audio receiver 210, the spectrogram generator 220, the harmonogram generator 230, the audio matcher 240, or any suitable combination thereof.

Figure 3:
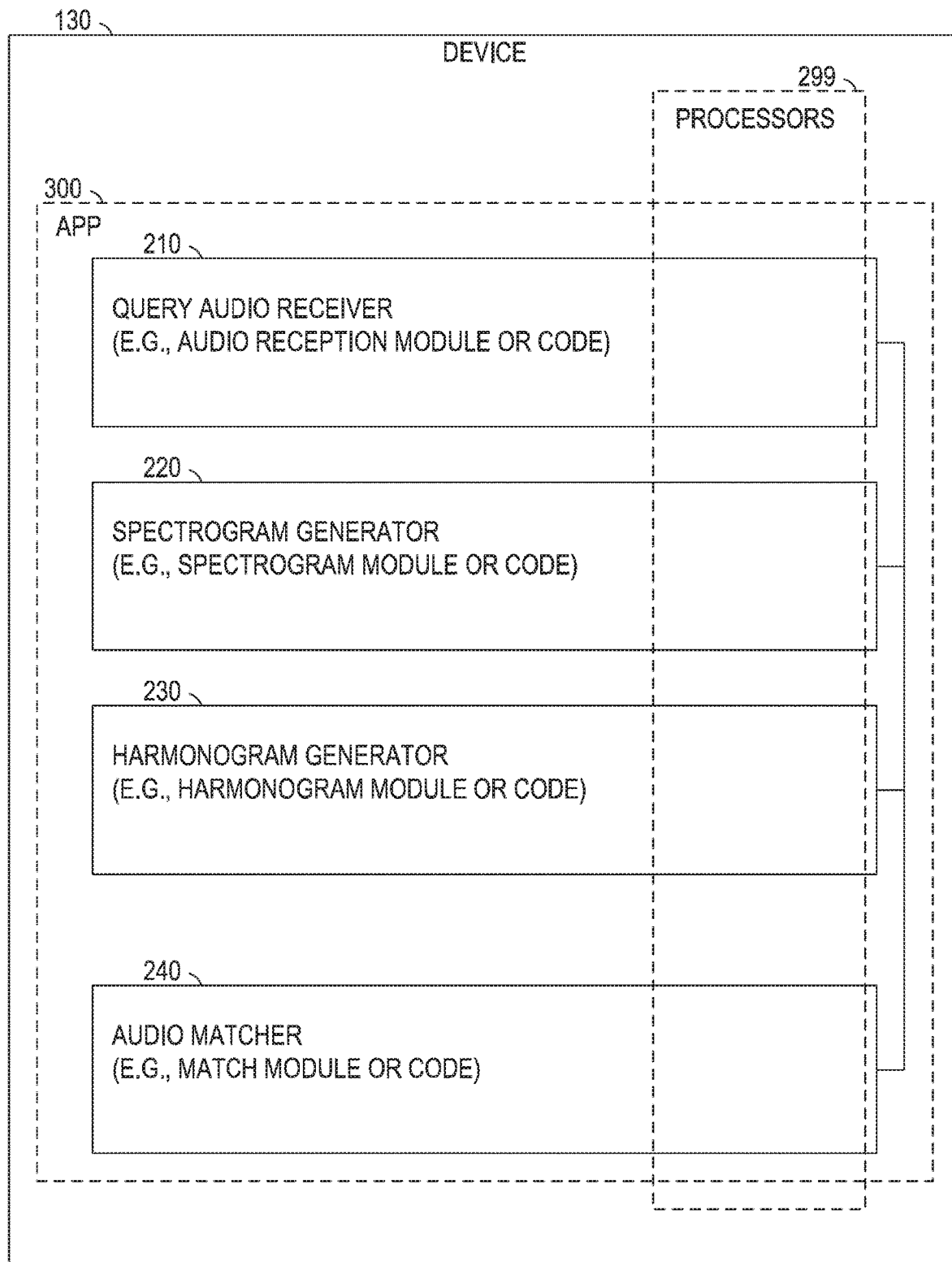
FIG. 3 is a block diagram illustrating components of a device suitable for audio matching based on a harmonogram, according to some example embodiments.

FIG. 3 is a block diagram illustrating components of the device 130, according to some example embodiments. In accordance with such example embodiments, the device 130 includes the query audio receiver 210, the spectrogram generator 220, the harmonogram generator 230, and the audio matcher 240, all configured to communicate with each other (e.g., via a bus, shared memory, or a switch). As shown in FIG. 3, the query audio receiver 210, the spectrogram generator 220, the harmonogram generator 230, and the audio matcher 240 may form all or part of an app 300 (e.g., a mobile app) that is stored (e.g., installed) on the device 130 and executable by the device 130 by one or more processors 299. Furthermore, the one or more processors 299 may be included (e.g., temporarily or permanently) in the app 300, the query audio receiver 210, the spectrogram generator 220, the harmonogram generator 230, the audio matcher 240, or any suitable combination thereof.

Figure 4:
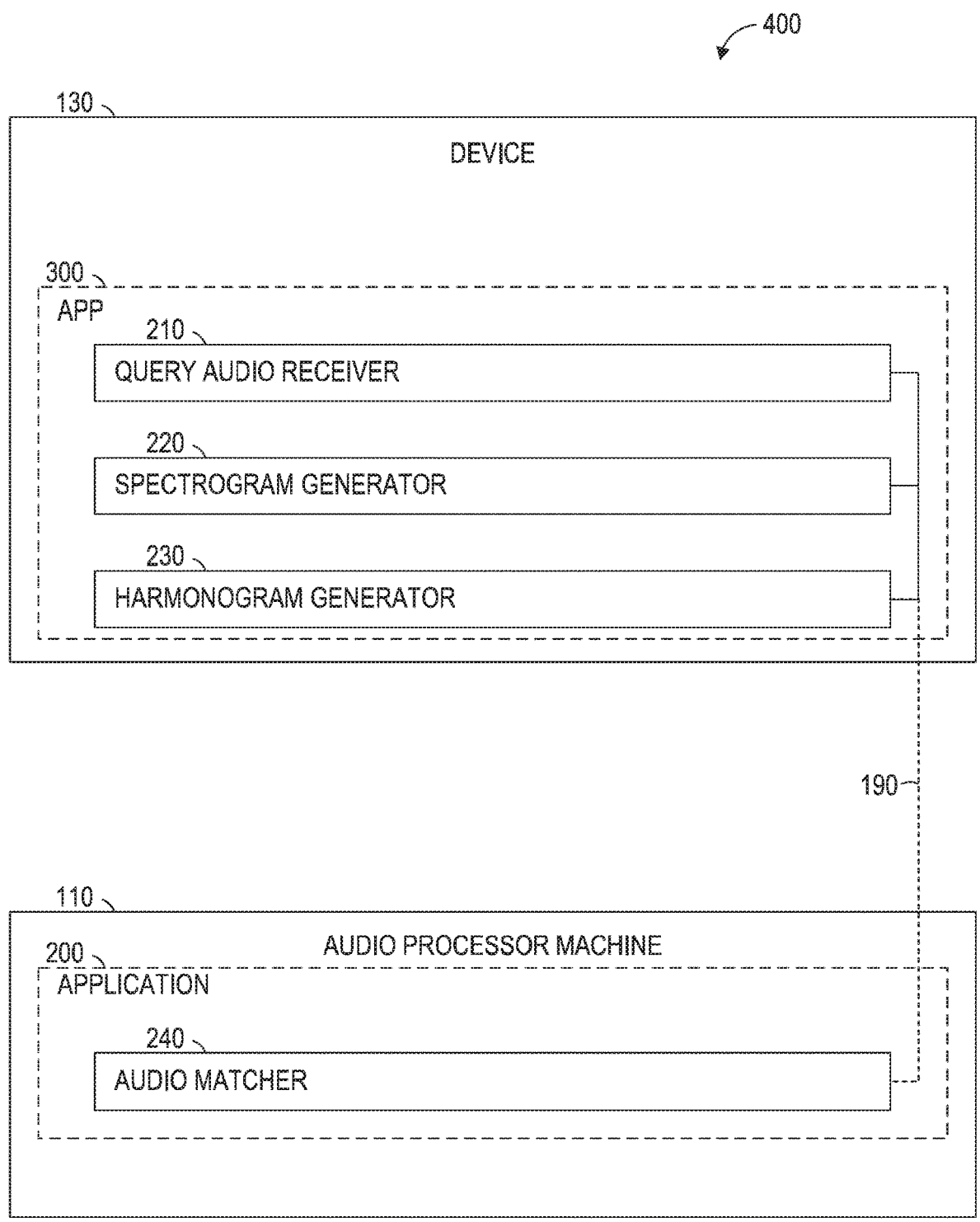
FIG. 4 is a block diagram illustrating components of a system (e.g., hybrid system) in which a device and an audio processor machine interoperate with each other to perform audio matching based on a harmonogram, according to some example embodiments.

FIG. 4 is a block diagram illustrating components of a hybrid system 400 in which the device 130 and the audio processor machine 110 interoperate with each other to perform audio matching based on a harmonogram, according to some example embodiments. In accordance with such example embodiments, the device 130 is configured by the query audio receiver 210, the spectrogram generator 220, and the harmonogram generator 230, one or more of which may form all or part of the app 300. Within the hybrid system 400, the audio processor machine 110 is configured by the audio matcher 240, which may form all or part of the application 200. Functions of these modules are described in greater detail below. As shown in FIG. 4, the query audio receiver 210, the spectrogram generator 220, the harmonogram generator 230, and the audio matcher 240, all configured to communicate with each other (e.g., via the network 190, a bus, shared memory, a switch, or any suitable combination thereof).

Any one or more of the components (e.g., modules) described herein may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 5:
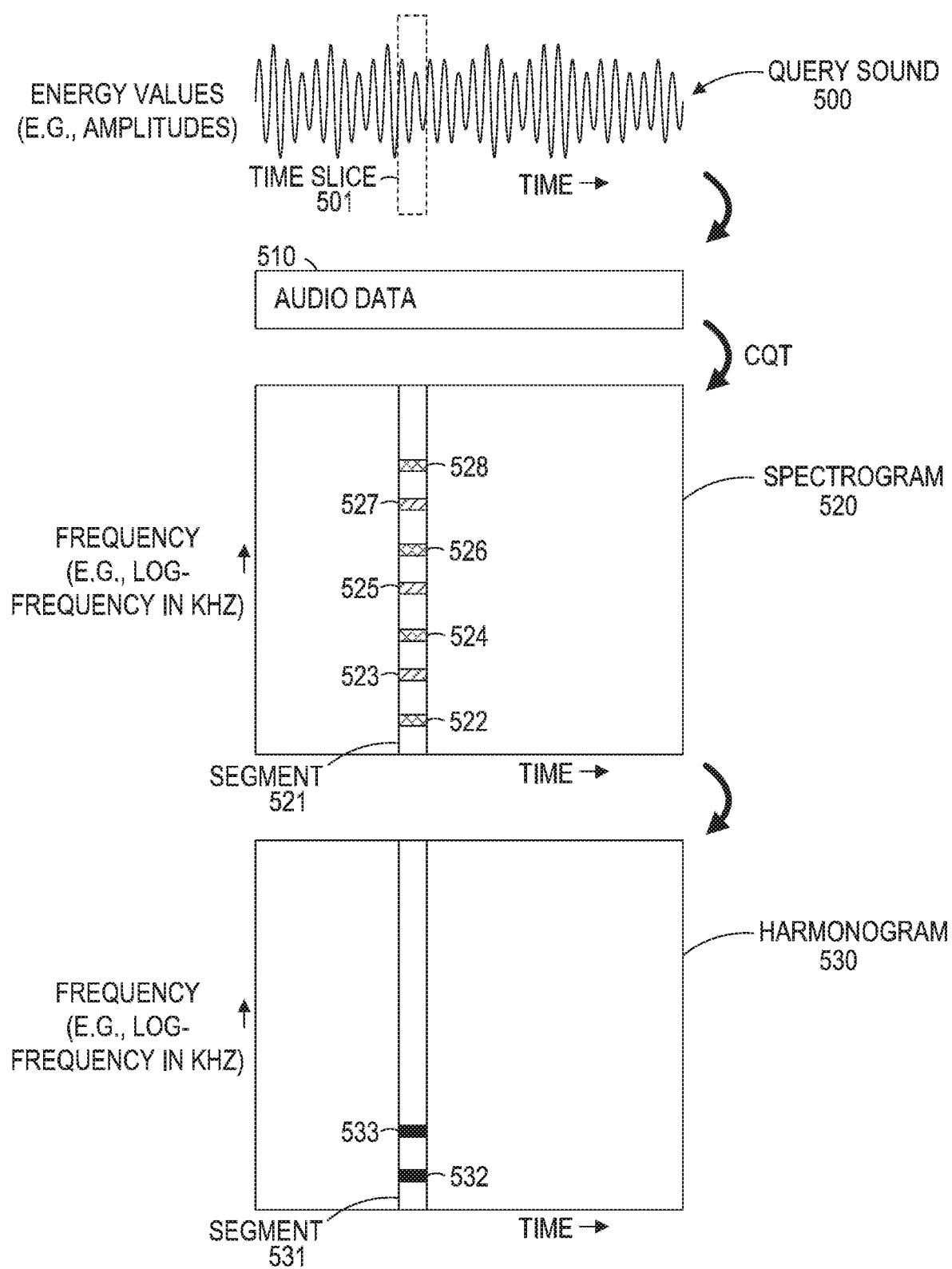
FIG. 5 is a conceptual diagram illustrating data generation via data processing to create a harmonogram (e.g., for audio matching or other audio analysis applications), according to some example embodiments.

FIG. 5 is a conceptual diagram illustrating data generation and processing to create a harmonogram, according to some example embodiments. As shown in FIG. 5, the query sound 500 is sampled to obtain audio data 510, such that the audio data 510 represents or otherwise indicates energy values of the query sound 500. The energy values may quantify amplitudes of acoustic pressure (e.g., pressure waves) within the query sound 500. Alternatively, the energy values may quantify acoustic power present in the query sound 500. As shown in FIG. 5, the query sound 500 may be subdivided into multiple (e.g., overlapping or non-overlapping) time slices, one of which is shown as a time slice 501 of the query sound 500. In some example embodiments, each time slice (e.g., time slice 501) represents a twenty (20) millisecond portion of the query sound 500. According to various example embodiments, the time slices (e.g., time slice 501) have a uniform duration that ranges from ten (10) milliseconds to thirty (30) milliseconds.

A spectrogram 520 can be generated from the audio data 510 (e.g., via CQT, FFT, or other transformation from a time domain to a frequency domain). For example, a portion of the audio data 510 may correspond to the time slice 501 in the query sound 500, and the audio processor machine 110 may perform a CQT on that portion of the audio data 510 to calculate energy values 522, 523, 524, 525, 526, 527, and 528 (e.g., amplitudes) that occurred at corresponding frequencies within the time slice 501. These corresponding frequencies may be represented (e.g., on a log frequency scale) in a segment 521 of the spectrogram 520. Accordingly, the segment 521 in the spectrogram 520 indicates the frequencies at which the energy values 522, 523, 524, 525, 526, 527, and 528 occurred in the query sound 500 during the time slice 501. In various example embodiments, each of the frequencies represented in the spectrogram 520 represents a quarter tone (e.g., fifty (50) cents of pitch), and any two adjacent frequencies represented in the spectrogram 520 are separated by a quarter tone.

Based on the spectrogram 520, a harmonogram 530 can be generated by identifying one or more dominant frequencies (e.g., fundamental frequencies) and their corresponding harmonics. In some example embodiments, the dominant frequency is the lowest harmonic (e.g., in the lowest octave) among multiple harmonics (e.g., in various octaves above the lowest octave). Considering the example shown in FIG. 5, a frequency (e.g., a first frequency) indicated by the energy value 522 has harmonics at higher frequencies that respectively correspond to the energy values 524, 526, and 528 (marked with similar crosshatching in FIG. 5), and is therefore a dominant frequency (e.g., a first dominant frequency). Similarly, another frequency (e.g., a second frequency) indicated by the energy value 523 has its harmonics at higher frequencies that respectively correspond to the energy values 525 and 527 (marked with similar line shading in FIG. 5), and is thus another dominant frequency (e.g., second dominant frequency). Accordingly, the frequency indicated by the energy value 522 and its harmonics are distinct from the frequency indicated by the energy value 523 and its harmonics.

As shown in FIG. 5, the harmonogram 530 includes a segment 531 that corresponds to the segment 521 of the spectrogram 520 (e.g., both corresponding to the time slice 501 of the query sound 500). Within the segment 531, energy values 532 and 533 indicate the dominant frequencies determined above. Specifically, the energy value 532 is an aggregate energy value that represents the combined energies of the energy values 522, 524, 526, and 528, and the energy value 532 is positioned to indicate that the frequency of the energy value 522 (e.g., as the lowest harmonic indicated by the energy values 522, 524, 526, at 528) is a dominant frequency (marked by solid shading in FIG. 5). Likewise, the energy value 533 is an aggregate energy value that represents the combined energies of the energy values 523, 525, and 527, and the energy value 533 is positioned to indicate that the frequency of the energy value 523 (e.g., as the lowest harmonic indicated by the energy values 523, 525, and 527) is a dominant frequency (marked by solid shading in FIG. 5).

These dominant frequencies may be represented (e.g., on a log frequency scale) in the segment 531 of the harmonogram 530. Accordingly, the segment 531 in the harmonogram 530 indicates the dominant frequencies present in the time slice 501 of the query sound 500, and also indicates the aggregate energy values 532 and 533 of those dominant frequencies. This may have the effect of coalescing, collecting, combining, or otherwise aggregating the energies of higher order harmonics into the energies of their corresponding fundamental frequencies to obtain the dominant frequencies present in the time slice 501 within the query sound 500. Thus, the segment 531 can be considered as a representation of the strongest harmonic components in the time slice 501 of the query sound 500.

As noted above, the query sound 500 may be subdivided into multiple time slices, among which is the time slice 501. Each of these time slices may be treated in a manner similar to that described above with respect to the time slice 501. Accordingly, the spectrogram 520 may include multiple segments similar to the segment 521, and the generated harmonogram 530 may include multiple segments similar to the segment 531. As noted above, the spectrogram 520 may be stored (e.g., in the database 115), processed, analyzed, or otherwise treated as an image (e.g., with the energy values 522-528 being pixel data, such as brightness data or color data, or being a basis for generating pixel data). Similarly, the harmonogram 530 may be stored (e.g., in the database 115), processed, analyzed, or otherwise treated as an image (e.g., with the energy values 532 and 533 as pixel data or bases from which pixel data is calculated). Accordingly, a graphics processing unit (GPU) may be configured (e.g., programmed) to process the spectrogram 520, the harmonogram 530, or both, according to any one or more of the methodologies discussed herein.

Figure 6:
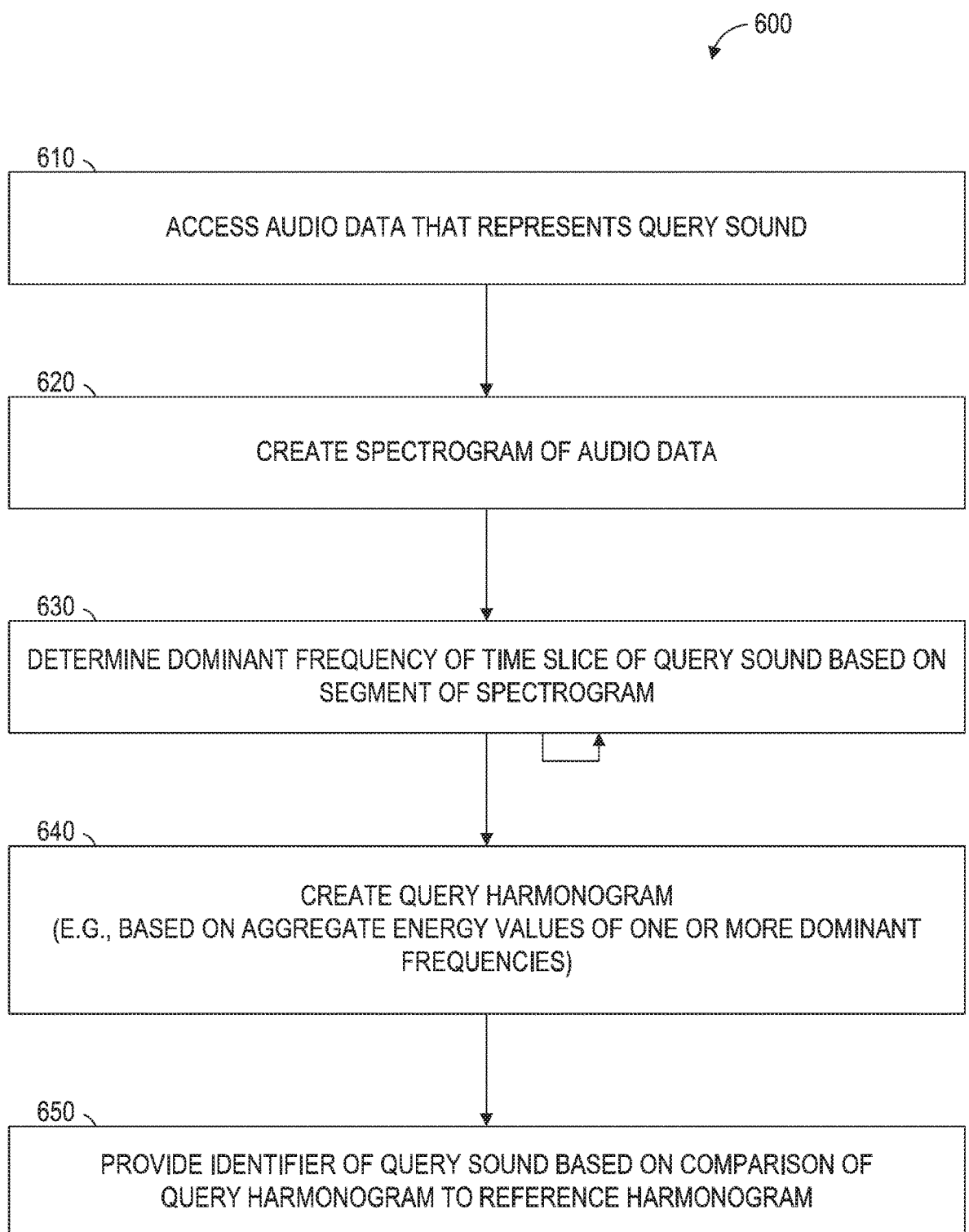
FIGS. 6-11 are flowcharts illustrating operations of the audio processor machine, the device, or both (e.g., as a system), in performing a method of audio matching based on a harmonogram, according to some example embodiments.

FIGS. 6-11 are flowcharts illustrating operations of the audio processor machine 110, the device 130, or both (e.g., in the hybrid system 400), in performing a method 600 of audio matching based on the harmonogram 530, according to some example embodiments. Operations in the method 600 may be performed using components (e.g., modules) described above with respect to FIGS. 2-4, using one or more processors (e.g., microprocessors or other hardware processors), or using any suitable combination thereof. As shown in FIG. 6, the method 600 includes operations 610, 620, 630, 640, and 650. According to various example embodiments, performance of operations 610, 620, 630, and 640 results in creation of the harmonogram 530, as described above with respect to FIG. 5.

In operation 610, the query audio receiver 210 accesses the audio data 510. The audio data 510 represents the query sound 500 (e.g., a query sound to be identified by the audio processor machine 110). For example, as noted above, the audio data 510 may represent or otherwise indicate energy values (e.g., energy values 522-528) of the query sound 500.

In operation 620, the spectrogram generator 220 creates the spectrogram 520 of the audio data 510. As noted above, the spectrogram 520 may be created from the audio data 510 by performing a CQT on a portion of the audio data 510 to obtain the energy values 522, 523, 524, 525, 526, 527, and 528 (e.g., amplitudes) that occurred at respectively corresponding frequencies within the time slice 501 of the query sound 500. As noted above, different segments (e.g., segment 521) of the spectrogram 520 represent or otherwise indicate energy values at their corresponding frequencies in different time slices of the query sound 500. Similar CQTs may be performed for one or more additional time slices within the query sound 500, and the energy values thus obtained may be represented within the created spectrogram 520 (e.g., in their own respective segments).

In operation 630, the harmonogram generator 230 determines a dominant frequency of the time slice 501 of the query sound 500. This determination is based on the segment 521 of the spectrogram 520. By repetition of operation 630, dominant frequencies of one or more additional time slices of the query sound 500 may be determined based on their corresponding segments of the spectrogram 520.

In operation 640, the harmonogram generator 230 creates the harmonogram 530 (e.g., a query harmonogram of the query sound 500). This may be performed in accordance with the above discussion of FIG. 5. In particular, the harmonogram 530 may be created based on the aggregate energy values (e.g., aggregate energy values 532 and 533) of dominant frequencies in each of multiple segments (e.g., segment 521) of the spectrogram 520. As noted above, different segments (e.g., segment 531) of the harmonogram 530 represent or otherwise indicate aggregate energy values at their corresponding dominant frequencies in different time slices of the query sound 500. Accordingly, these aggregate energy values may be represented within the created harmonogram 530 (e.g., in their own respective segments). Furthermore, these aggregate energy values may be represented on a log frequency scale (e.g., at their respective dominant frequencies on a logarithmically scaled axis or at logarithms of their respective dominant frequencies on a linearly scaled axis) in their respective segments within the harmonogram 530.

In operation 650, the audio matcher 240 provides an identifier (e.g., a song title) of the query sound 500 based on a comparison of the harmonogram 530 (e.g., the query harmonogram of the query sound 500) to one or more reference harmonograms (e.g., harmonograms of reference sounds, such as reference songs), one or more of which may be correlated (e.g., by the database 115) with the identifier of the query sound. Accordingly, the audio matcher 240 may access (e.g., read or retrieve) the identifier in response to determining that the harmonogram 530 matches one of the reference harmonograms (e.g., stored in the database 115 and mapped to the identifier). According to various example embodiments, the identifier is provided in response to (e.g., in fulfillment of) a submission of the query sound 500, the audio data 510, or both, within a query (e.g., a request to identify the query sound 500) received from the device 130 of the user 132.

Figure 7:
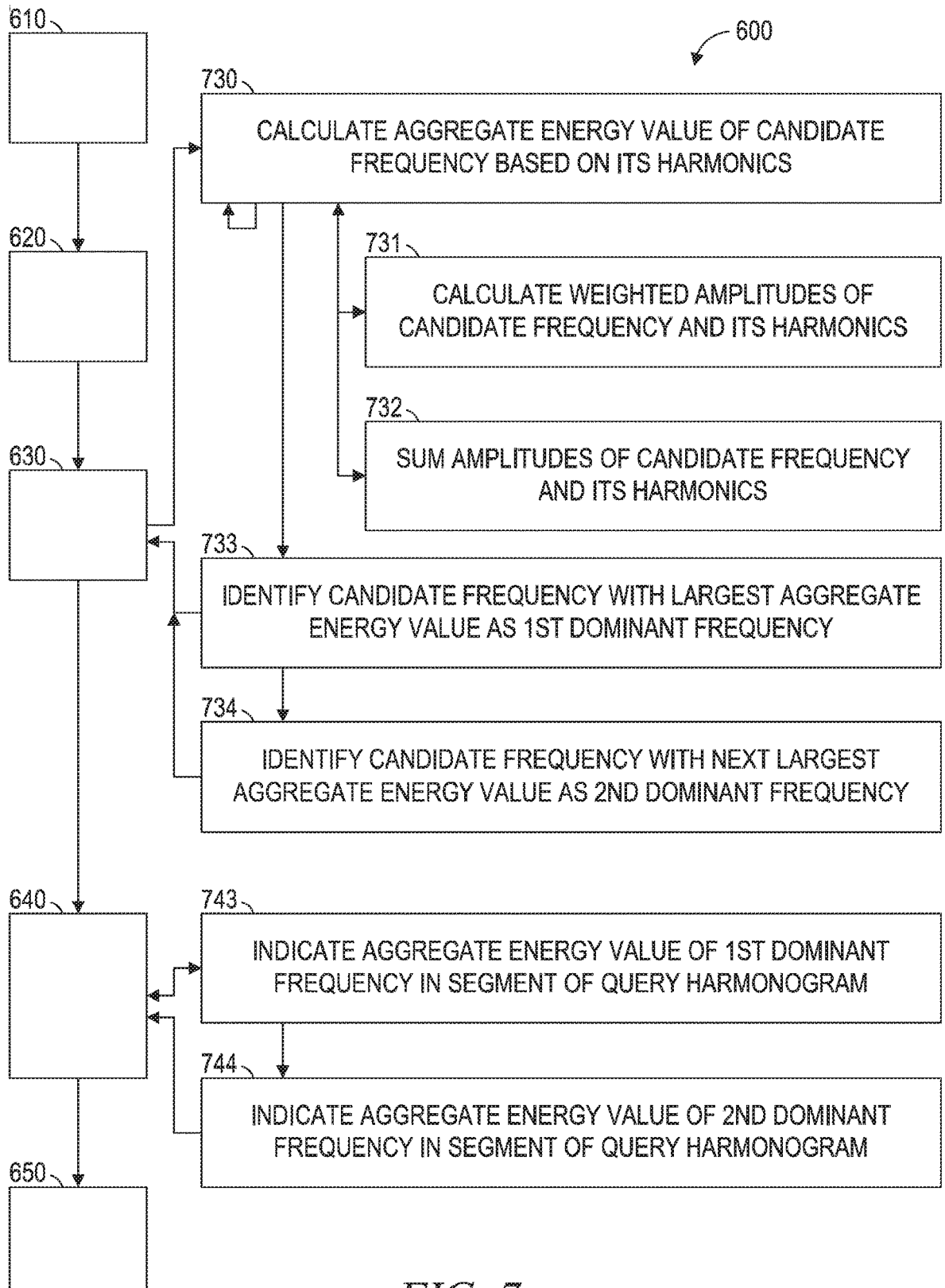

As shown in FIG. 7, in addition to any one or more of the operations previously described, the method 600 may include one or more of operations 730, 731, 732, 733, 734, 743, and 744. One or more of operations 730, 731, 732, 733, and 734 may be performed as part (e.g., a precursor task, a subroutine, or a portion) of operation 630, in which the harmonogram generator 230 determines the dominant frequency of the time slice 501.

In operation 730, the harmonogram generator 230 calculates an aggregate energy value (e.g., aggregate energy value 532) of a candidate frequency (e.g., a frequency to be tested to determine whether the frequency is a dominant frequency). This calculation may be based on the harmonics of the candidate frequency (e.g., and no harmonics of any other candidate frequency). In particular, this calculation may be based on energy values (e.g., energy values 522, 524, 526, and 528) at the candidate frequency and its harmonics (e.g., distinct from any other candidate frequency and its harmonics), as represented in the spectrogram 520 (e.g., within the segment 521 of the spectrogram 520). By repetition of operation 730, multiple aggregate energy values (e.g., aggregate energy values 532 and 533) of the candidate frequency can be calculated.

One or more of operations 731 and 732 may be performed as part of operation 730. In operation 731, the harmonogram generator 230 calculates weighted energy values (e.g., weighted amplitudes) of the candidate frequency and its harmonics. For example, the harmonogram generator 230 may apply a weighting function to the energy values 522, 524, 526, and 528 or multiply predetermined weighting values to the energy values 522, 524, 526, and 528.

In operation 732, the harmonogram generator 230 sums (e.g., adds) the energy values (e.g., weighted in operation 731) of the candidate frequency and its harmonics. In some example embodiments, the summation of the energy values (e.g., weighted energy values) is the aggregate energy value being calculated in operation 730. In alternative example embodiments, the summation is a basis for calculating the aggregate energy value, and one or more further calculations are performed by the harmonogram generator 230 to obtain the aggregate energy value.

In operation 733, the harmonogram generator 230 identifies the candidate frequency (e.g., first candidate frequency) with the largest aggregate energy value as a dominant frequency (e.g., first dominant frequency or first most dominant frequency) that indicates the strongest harmonic component present in the time slice being processed (e.g., time slice 501). This may be performed by comparing the aggregate energy values (e.g., aggregate energy values 532 and 533) calculated from a segment (e.g., segment 521) of the spectrogram 520, and ranking the aggregate energy values. In some example embodiments, only aggregate energy values that transgress a predetermined threshold value (e.g., minimum value) are compared against each other. Hence, in some situations, only one dominant frequency (e.g., first dominant frequency) is identified for the time slice (e.g., time slice 501) being processed.

In other situations, multiple dominant frequencies are identified for the time slice (e.g., time slice 501) being processed, and operation 734 may accordingly be performed. In operation 734, after identifying a first dominant frequency (e.g., first most dominant frequency), the harmonogram generator 230 identifies the candidate frequency (e.g., second candidate frequency) with the next-largest aggregate energy value as another dominant frequency (e.g., second dominant frequency or second most dominant frequency) that indicates the second-strongest harmonic component present in the time slice being processed (e.g., time slice 501). This may be performed similarly to operation 733. According to various example embodiments, operation 734 may be repeatedly performed to identify additional dominant frequencies (e.g., third dominant frequency, fourth dominant frequency, fifth dominant frequency, etc.) in the time slice being processed. As noted above, the multiple dominant frequencies may be identified and represented (e.g., by the aggregate energy values 532 and 533) in the same segment (e.g., the segment 531) of the harmonogram 530 (e.g., the query harmonogram).

One or more of operations 743 and 744 may be performed as part of operation 640, in which the harmonogram generator 230 creates the harmonogram 530 (e.g., the query harmonogram). In example embodiments that include operation 733, in which the candidate frequency with the largest aggregate energy value is identified as a dominant frequency (e.g., first dominant frequency), the harmonogram generator 230 performs operation 743 by indicating the aggregate energy value (e.g., aggregate energy value 532) of the dominant frequency identified in operation 733. That is, this aggregate energy value may be indicated in the corresponding segment (e.g., segment 531) of the harmonogram 530.

In example embodiments that include operation 734, in which the candidate frequency with the next-largest aggregate energy value is identified as a second dominant frequency, the harmonogram generator 230 performs operation 744 by indicating the aggregate energy value (e.g., aggregate energy value 533) of the second dominant frequency identified in operation 734. In other words, this aggregate energy value may be indicated in the corresponding segment (e.g., segment 531) of the harmonogram 530.

Figure 8:
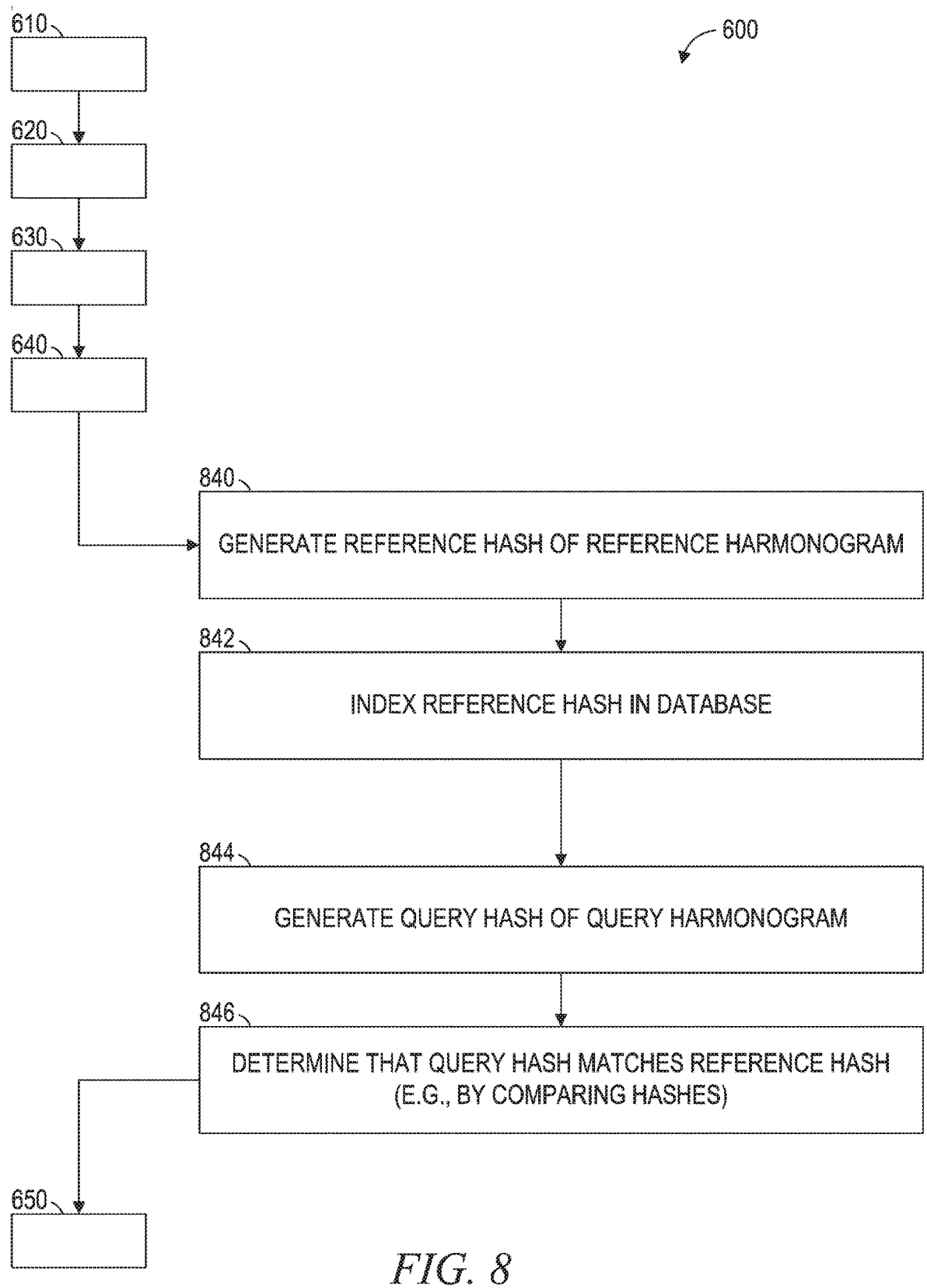

As shown in FIG. 8, some example embodiments of the method 600 include one or more of operations 840, 842, 844, and 846, one or more of which may be performed between operation 640 and 650. In operation 840, the audio matcher 240 generates a reference hash of a reference harmonogram (e.g., an algorithmic hash of the harmonogram generated from a reference audio, such as the reference song). The reference hash, the reference harmonogram, or both, may be stored in the database 115. The reference harmonogram may be the same reference harmonogram described above with respect to operation 650 and accordingly be the reference harmonogram with which the harmonogram 530 (e.g., the query harmonogram) will be compared in operation 650.

In operation 842, the audio matcher 240 indexes the reference hash (e.g., generated in operation 840) in the database 115. This may have the effect of facilitating faster, less computationally intensive, or otherwise more efficient searches or comparisons of reference hashes stored in the database 115.

In operation 844, the audio matcher 240 generates a query hash of the harmonogram 530 (e.g., the query harmonogram). The query hash, the harmonogram 530, or both, may be stored in the database 115.

In operation 846, the audio matcher 240 determines that the query hash of the harmonogram 530 matches the reference hash of the reference harmonogram. This may be performed by comparing the query hash to the reference hash and determining that the two hashes match (e.g., within a threshold tolerance, which may be expressed as a threshold percentage by which the two hashes can differ). In example embodiments that include operation 846, the providing of the identifier of the query sound 500 in operation 650 is based on the determination performed in operation 846.

According to various example embodiments, the harmonogram generator 230 may modify the harmonogram 530 according to various algorithms for removing noise, removing artifacts, smoothing discontinuities, or any suitable combination thereof. In such example embodiments, the providing of the identifier of the query sound 500 in operation 650 is based on the modified harmonogram 530 (e.g., modified query harmonogram). Examples of such modifications are discussed presently with respect to FIGS. 9-11.

Figure 9:
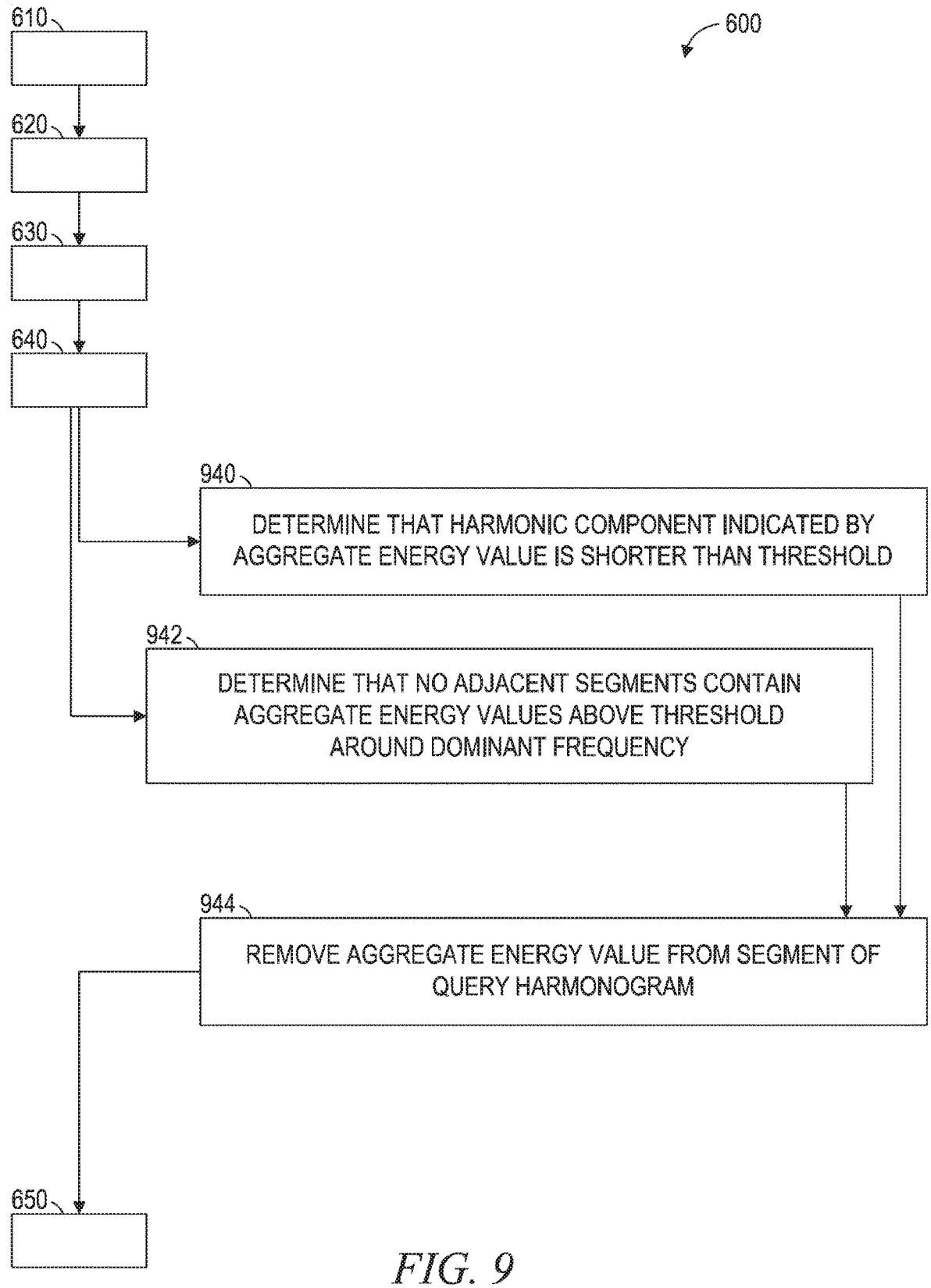

As shown in FIG. 9, some example embodiments the method 600 may include one or more of operations 940, 942, and 944, one or more of which may be performed between operations 640 and 650. Some example embodiments of the method 600 include operations 940 and 944 together, while some example embodiments of the method 600 include operations 942 and 944 together.

In operation 940, the harmonogram generator 230 determines that a harmonic component indicated by an aggregate energy value (e.g., aggregate energy value 533) in the harmonogram 530 is shorter than a threshold duration (e.g., a threshold minimum duration) within the query sound 500. For example, the harmonogram generator 230 may analyze one or more neighboring segments (e.g., adjacent segments) of the segment 531, which corresponds to the time slice 501 of the query sound 500. The neighboring segments may be a set of contiguous segments before or after the segment 531. Considering the segment 531 as an example, if the aggregate energy value 533 has counterparts in the neighboring segments (e.g., at the same dominant frequency or within a threshold range of the dominant frequency, such as, within a quarter tone above or below the dominant frequency), the harmonogram generator 230 calculates the total duration of this harmonic component (e.g., indicated by the number of contiguous segments in the harmonogram 530) and determines whether the total duration is less than the threshold duration.

Continuing this example, if the total duration is shorter than the threshold duration, the harmonogram generator 230 may respond by performing operation 944 by removing the aggregate energy value 533 from the harmonogram 530 (e.g., along with removal of its counterparts in the neighboring segments). That is, the determination performed in operation 940 may trigger the performance of operation 944. This may have the effect of omitting or minimizing the influence of very short harmonic components or noise artifacts from the harmonogram 530 and subsequent operations based on the harmonogram 530 (e.g., operation 650, in which the identifier of the query sound 500 is provided).

In operation 942, the harmonogram generator 230 determines that no adjacent segments of the segment 531 in the harmonogram 530 contain any aggregate energy values that are both above a threshold value (e.g., a threshold minimum value) and within a threshold tolerance (e.g., threshold minimum distance, such as one semitone or one full tone, on a frequency scale or log frequency scale) of the dominant frequency at which the aggregate energy value 533 occurs. In other words, the harmonogram generator 230 may determine that the aggregate energy value 533 has no counterparts in any adjacent segments. Based on this determination in operation 942, the harmonogram generator 230 may respond by performing operation 944 by removing the aggregate energy value 533 from the harmonogram 530. This may have the effect of omitting or minimizing the influence of extremely short harmonic components or noise artifacts from the harmonogram 530 and subsequent operations based on the harmonogram 530 (e.g., operation 650, in which the identifier of the query sound 500 may be found and provided).

Figure 10:
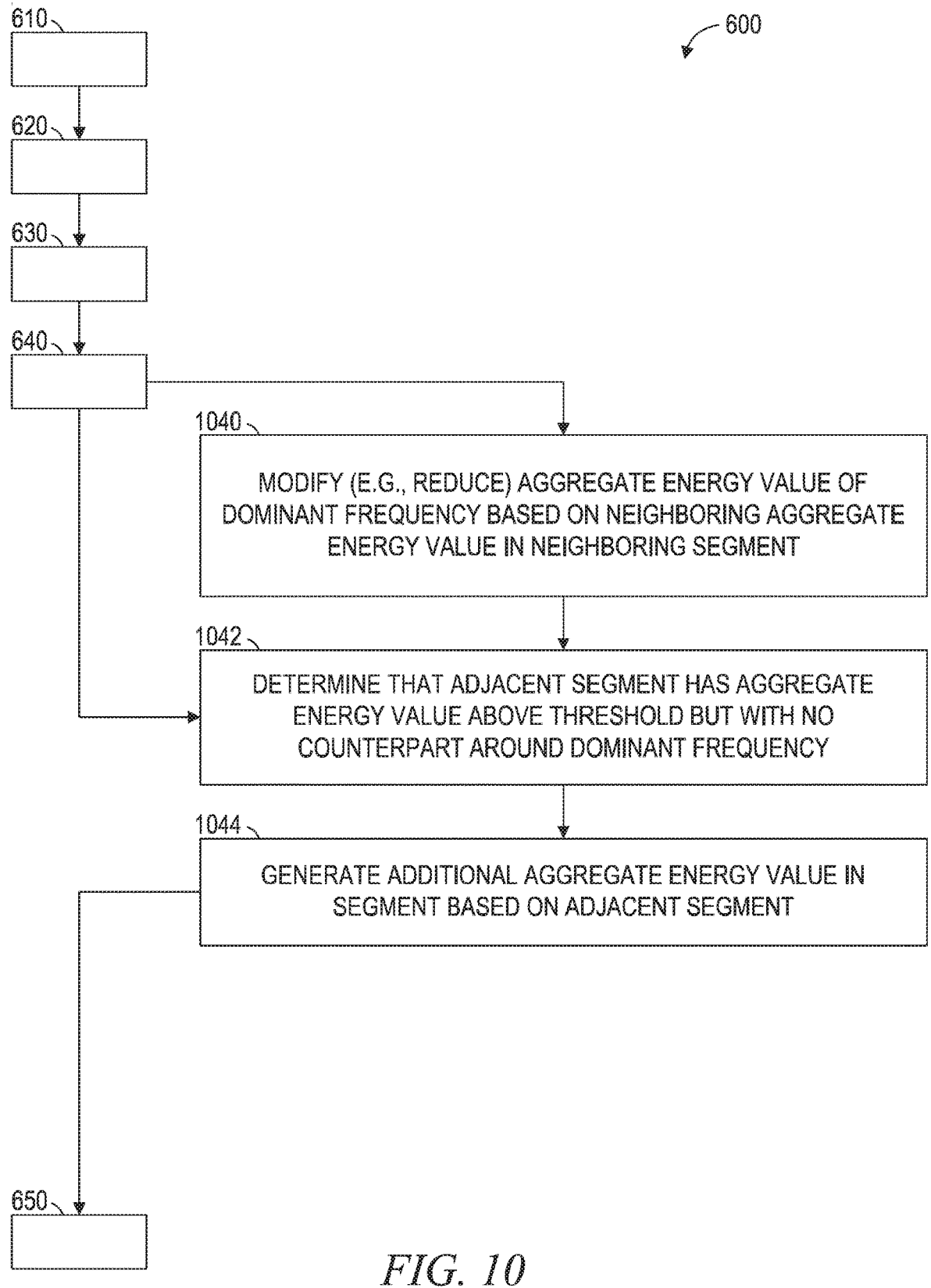

As shown in FIG. 10, some example embodiments of the method 600 may include one or more of operations 1040, 1042, and 1044, one or more of which may be performed between operations 640 and 650. Some example embodiments of the method 600 include operations 1040 and 1044 together, while some example embodiments of the method 600 include operations 1042 and 1044 together. Certain example embodiments of the method 600 include operations 1040, 1042, and 1044 together.

In some example embodiments, the harmonogram generator 230 modifies the dominant frequency (e.g., the first dominant frequency or the most dominant frequency) at which the aggregate energy value 532 occurs in the segment 531 of the harmonogram 530 (e.g., the query harmonogram). This may be performed by shifting the dominant frequency higher or lower (e.g., by a quarter tone) to match a neighboring dominant frequency at which a neighboring aggregate energy value occurs in a neighboring segment (e.g., a segment adjacent to the segment 531) in the harmonogram 530. The modifying of the dominant frequency may have the effect of omitting or minimizing the influence of harmonic components that vary excessively in pitch (e.g., harmonic components with excessive vibrato).

In the example embodiments shown in FIG. 10, this modification of the dominant frequency is accomplished by performance of operations 1040 and 1044. In operation 1040, the harmonogram generator 230 reduces (e.g., to zero or to a predetermined nominal value) the aggregate energy value 532 based on (e.g., in response to) the neighboring dominant frequency at which the neighboring aggregate energy value occurs in the neighboring segment (e.g., adjacent segment). In operation 1044, the harmonogram generator 230 generates a replacement (e.g., additional or substitute) aggregate energy value at the shifted dominant frequency (e.g., higher or lower by a quarter tone) in the segment 531. The shifted dominant frequency may match the neighboring dominant frequency in the neighboring segment.

In certain example embodiments, the harmonogram generator 230 can fill in one or more gaps within the harmonic component represented in the harmonogram 530. As shown in FIG. 10, this may be performed by performing operations 1042 and 1044. In operation 1042, the harmonogram generator 230 determines that one or more neighboring segments (e.g., adjacent segments) of the harmonogram 530 contain a neighboring aggregate energy value that is above a threshold value (e.g., a threshold minimum value) and beyond a threshold tolerance (e.g., threshold maximum distance, such as one quarter tone or one semitone, on a frequency scale or log frequency scale) of the dominant frequency at which the aggregate energy value 533 occurs. That is, the harmonogram generator 230 may determine that the segment 531 contains no counterpart (e.g., above the minimum threshold value) for the neighboring aggregate energy value. Accordingly, the harmonogram generator 230 may detect that a gap exists in the harmonic component represented by the neighboring aggregate energy values in the neighboring segments.

Based on the determination performed in operation 1042, the harmonogram generator 230 may perform operation 1044, in a manner similar to that described above. For example, the harmonogram generator 230 may generate an additional (e.g., gap filling) aggregate energy value at the frequency (e.g., neighboring dominant frequency) indicated by the neighboring aggregate energy value that is above the threshold value but beyond the threshold tolerance of the dominant frequency at which the aggregate energy value 533 occurs in the segment 531. This may have the effect of filling a detected gap in the harmonic component represented by the neighboring aggregate energy value (e.g., and represented by one or more other neighboring aggregate energy values).

Figure 11:
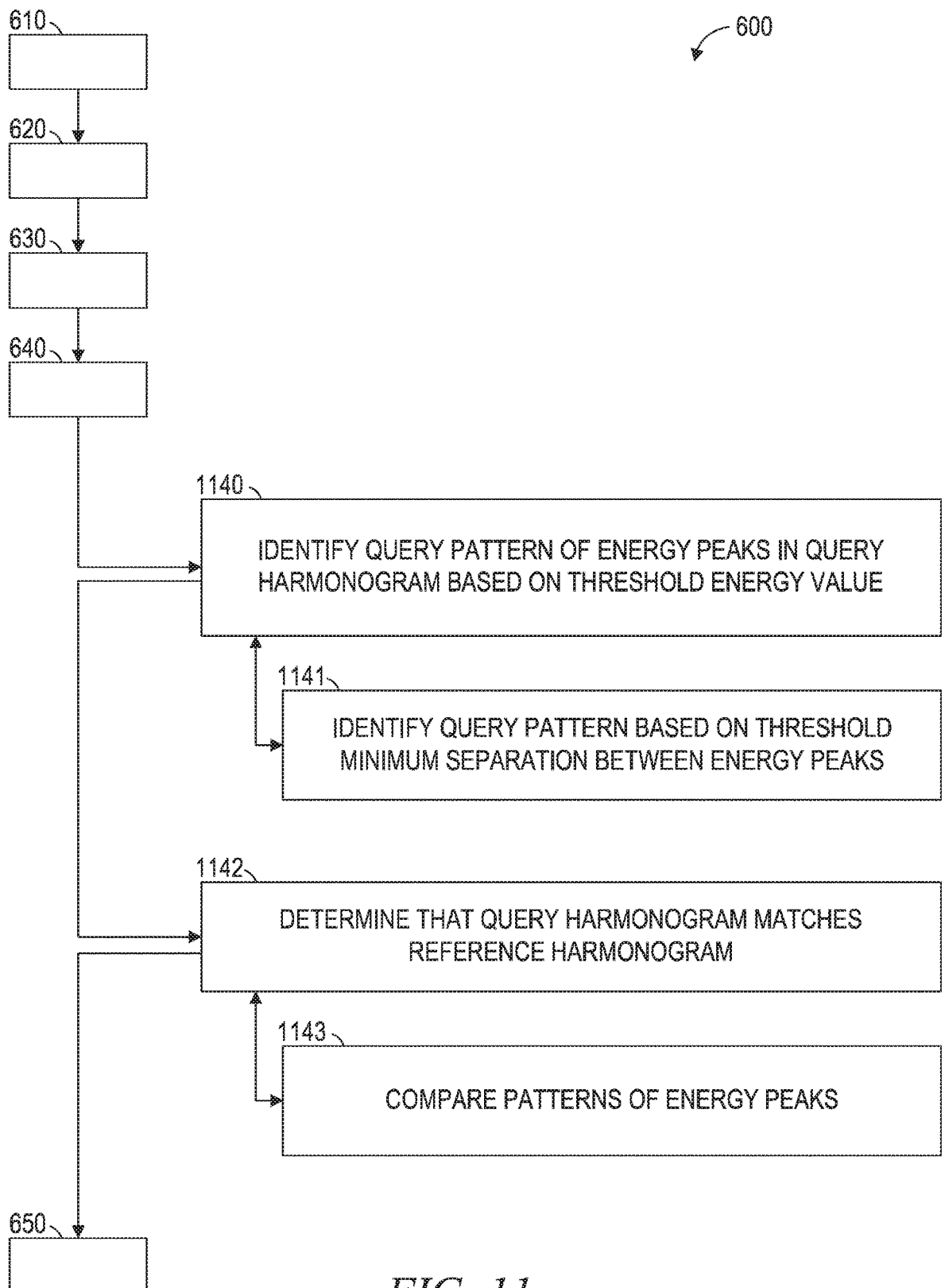

As shown in FIG. 11, some example embodiments of the method 600 may include one or more of operations 1140, 1141, 1142, and 1143. In operation 1140, the audio matcher 240 identifies a query pattern of energy peaks (e.g., locally maximum aggregate energy values) in the harmonogram 530 (e.g., the query harmonogram) based on a threshold energy value (e.g., threshold minimum energy value). For example, the audio matcher 240 may identify a query pattern by subtracting the threshold energy value from all aggregate energy values (e.g., aggregate energy values 532 and 533) in the segment 531 of the harmonogram 530. This subtraction may be performed for all other segments of the harmonogram 530, and the audio matcher 240 may proceed to consider only positive values to obtain the query pattern.

In some example embodiments, operation 1141 is performed as part of 1140. In operation 1141, the audio matcher 240 additionally applies a threshold minimum separation between energy peaks in identifying the query pattern. For example, the audio matcher 240 may ignore smaller aggregate energy values that occur within a threshold tolerance (e.g., two quarter tones or three quarter tones) of a locally maximum aggregate energy value (e.g., energy value 532).

In operation 1142, the audio matcher 240 determines that the harmonogram 530 (e.g., the query harmonogram) matches the reference harmonogram (e.g., stored in the database 115 and accessed therefrom by the audio matcher 240). As shown in FIG. 11, operation 1143 may be performed as part of operation 1142. In operation 1143, the audio matcher 240 compares patterns of energy peaks to determine that the harmonogram 530 matches the reference harmonogram. In particular, the audio matcher 240 may access a reference pattern of energy peaks from the reference harmonogram (e.g., from the database 115) and compare the reference pattern of energy peaks to the query pattern of energy peaks (e.g., as identified in operation 1140). Based on this comparison, the audio matcher 240 may proceed to perform operation 650, as described above with respect to FIG. 6.

In addition, consistent with the above-described methods and systems, a harmonogram-based fingerprinting technique or a harmonogram itself may be used to identify and retrieve user-uploaded recordings from a performance (e.g., for copyright clearance purposes, to automatically tag or index such recordings, or any suitable combination thereof). In some example embodiments, a machine identifies the performer of the live version (e.g., by detecting a venue at which the live version is being performed and accessing information that correlates the detected venue with the performer). The machine may then access a set of reference fingerprints that correspond to the artist that recorded the audio piece (e.g., based on the identified performer of the live version). For example, based on the identified performer (e.g., as well as a detected venue, a current date and time, or any suitable combination of), the machine may retrieve a list of audio pieces (e.g., a playlist, a concert program, or a concert brochure) that corresponds to the performer. Based on the reference fingerprints (e.g., using the retrieved list), the machine identifies reference versions (e.g., official or canonical versions) of the audio pieces (e.g., recorded by the artist, who may be the same or different from the performer of the live version) and accesses reference fingerprints of the identified reference versions of the audio pieces. The reference fingerprints may have been previously generated from segments of the reference versions of the audio pieces, and among these reference fingerprints may be a reference fingerprint of the reference version of the audio piece whose live version is currently being performed. Accordingly, the machine may compare the live fingerprint of a segment of the live version of an audio piece to the set of reference fingerprints of segments from the reference versions of the audio piece.

In various example embodiments, the machine compares the live fingerprint exclusively (e.g., only) to the set of reference fingerprints. Based on this comparison, the machine identifies a match between the live fingerprint and the reference fingerprints and thus identifies the audio piece while the audio piece is being performed live. Thus, based on this comparison, the machine may provide an identifier of the audio piece in a response to the query for identification of the audio piece. The identifier may be provided during the performance of the live version of the audio piece. As a live performance can vary significantly in pitch, tempo, instrumentation, vocal character, timbre, and mix of the instruments, the identification approaches need to be robust against all these alterations. To allow for an expanded search (e.g., to allow for the live performance to be even more significantly different from the studio recording), some example embodiments select a subset (e.g., sub-group) of likely songs that may be performed live. This subset may be the entire recorded catalog of an artist, or all unique songs recorded by an artist (e.g., excluding re-masters or re-recordings of songs), or songs the artist has been known to have performed at other live events.

In some example embodiments, a live music fingerprint is created and used in recognizing a live performance. An example approach begins with a machine taking an FFT of energy values in the audio every 100 milliseconds. Next, the machine converts each FFT into a CQT that covers four (4) octaves with twenty-four (24) quarter tones per octave to yield a total of ninety-six (96) quarter tones. Next, the machine concatenates the CQT transforms into a spectrogram that spans the full length of the audio. Next, the machine performs two-dimensional median filtering with a certain size across the entire CQT spectrogram. After the median filtering, the machine quantizes (e.g., into binary representations) each of the energy values represented in the CQT spectrogram to either a one or a zero, based on whether a given energy value transgresses a certain threshold. In some example embodiments, these operations yield a ninety-six by N (96×N) binary bit map matrix, which in some situations may be called the "raw" fingerprint for a given piece of audio.

In some example embodiments, the machine creates a single sub-fingerprint that consists of ninety-six (96) CQT values (e.g., music pitches), which represent the audio for a length of 100 milliseconds. These values may have been binarized during the fingerprinting process, and the sub-fingerprint may accordingly be ninety-six (96) bits that are either a 0 or a 1. In some example embodiments, a query fingerprint is or includes a bit matrix that is ninety-six (96) rows by M columns. The M columns may be determined by the length of the query audio. For instance, if the query audio is six (6) seconds in length, then M may be sixty (60), which corresponds to a new sub-fingerprint every 100 milliseconds. Thus, a query fingerprint made from six (6) seconds of audio may be or include a bit matrix of 96×60 values that are each either a 0 or a 1.

In various example embodiments, the machine compares the query fingerprint matrix to each reference fingerprint matrix in the database and calculates a score for each comparison. The score may be numerical, alphanumeric, machine code, or any other type of indicator. In some example embodiments, each reference fingerprint in the database represents a single song or music piece. In certain example embodiments, each reference fingerprint is a bit matrix that is ninety-six (96) rows by N columns, like the query fingerprint. The value of N may approximately be the length (e.g., duration) of the reference song in seconds times ten (10), with each 96-bit sub-fingerprint representing 100 milliseconds of audio. The machine may calculate a score, for example, by adding how many bits are identical for a patch of ninety-six (96) bits by twenty (20) bits between the query matrix and the reference matrix. A query may be placed by the machine at the first column in the reference matrix, and the machine may count the number of matching bits. A separate matching matrix may be created by the machine to keep track of the scores. In some example embodiments, if the number of matching bits is above a threshold (e.g., threshold percentage), then the machine assigns the location of this 96 by 20 (96×20) patch a value of one (1) in the matching matrix. One example of the matching percentage threshold could be sixty percent (60%). In this case, if at least sixty percent (60%) of the 96×20 bits are matched for this given patch, the matching matrix location is given a one (1). If the percentage of matching bits is less than sixty percent (60%), then the matching matrix is zero for this location (e.g., a first location). The machine then increments the query and reference patches (e.g., moved forward by 100 milliseconds to a second location), and the machine calculates a corresponding score with a corresponding 1 or 0 marked for this next (e.g., second) location in the matching matrix, as was done for the previous (e.g., first) location. This process may be repeated until the machine reaches the last 96×20 patch for the query. A matching matrix sequence for the query in comparison to the reference is now established (e.g., starting at the first location). In this manner, the machine may calculate a score for every possible starting point for the query matrix against the reference matrix, and the resulting matching matrix contains a series of ones and zeros for each possible time alignment of the query with the reference.

Since the musical key of the query and reference may differ, the calculations discussed above may also be performed by moving the query matrix up and down vertically compared to the reference matrix. Since the vertical direction in the matrices corresponds to the musical pitch of the song or music piece, a query can still be recognized even if it is played in a different key from the reference. The query matrix is moved up one row relative to the reference matrix, and the machine performs calculations as described above. The machine may continue to move the query matrix up relative to the reference matrix until a threshold has been reached (e.g., a maximum pitch deviation threshold). Since each row represents a musical interval (e.g., a quarter tone), the number of times that the query matrix is moved can be set by the likelihood that the query will differ in key from the reference. Similarly, the machine may move the query down one step at a time until the negative of the threshold (e.g., pitch deviation threshold) is reached. For example, a pitch deviation threshold could be set to four (4) quarter tones, in which case the query would be checked four quarter tones above and below the key in which it was recorded. This would result in creation of a matching matrix that contains the score of each possible alignment in both time and pitch between the query and a given reference. For each time and pitch alignment, there is a possible number of M−20 patches that matched above the threshold between the query and the reference.

The time and pitch alignment with the maximum number of matching patches is located by the machine, for example, by going through the matching matrix created as described above. As an example, if the query was six (6) seconds in length, M would be sixty (60), and there would be possible matching patches for a given time and pitch alignment above the threshold mentioned above. By going back through the matching matrix, the machine may find the location with the highest number of matching patches. Some example embodiments of the machine normalize this maximum score by the number of possible matches to give a confidence score that is between 0 and 1. In the case of a six-second query, the machine may divide the maximum score by forty (40) to calculate a final confidence score. The machine may also log the location of the maximum score in the reference matrix to record where the query best matched the reference audio.

In various example embodiments, the machine performs the above-described operations and determines the final score and its location for each comparison between the query and each reference audio (e.g., reference song) in a reference database. For example, there may be a score between 0 and 1 and a location for each song in the reference database. If the highest of the maximum scores between the query and each of the songs in the database is above a threshold (e.g., a false positive threshold), the reference corresponding to the highest score is declared (e.g., by the machine) to be a match to the query that is playing. If there is no score in the reference database that is above the threshold, then the query is declared to not be a match to any songs in the database. For example, a false positive ratio of 0.5 could be set, and a match is declared only if the maximum score for the reference database and the query is above 0.5. According to some example embodiments, this patch scoring method is able to deal with tempo differences between the query and the reference. In this way, the machine can avoid using the Hough transform and other dynamic time warping techniques.

In some example embodiments, after a successful recognition, additional data such as artist, song, title, and genre, as well as download links to recorded versions of the song, can be provided to a user. Also links to websites (e.g., YouTube®) providing recorded versions of live events where the same song was performed can be presented to the user. This information can then be used for sharing the event experience (e.g., via Twitter®) or for auto-tagging photos or videos that the user may capture on one or more mobile devices. This information may also enable auto-generation of set lists of events, which could be used for play listing (e.g., playing all the recorded songs of the artist that have been performed at the last concert, such as in order of performance).

According to various example embodiments, one or more of the methodologies described herein may facilitate audio matching based on one or more harmonograms. Moreover, one or more of the methodologies described herein may facilitate rapid (e.g., real time) identification of live audio via comparison and matching of harmonograms. In addition, one or more of the methodologies described herein may facilitate query-by-humming, identification (e.g., isolation or extraction) of multiple pitches within polyphonic audio, source separation (e.g., identification of musical parts corresponding to instruments, instrumental sections, voices, or vocal sections) in polyphonic audio, or any suitable combination thereof.

When the effects discussed herein are considered in aggregate, one or more of the methodologies described herein may obviate a need for certain efforts or resources that otherwise would be involved in any one or more of the above-mentioned types of audio processing (e.g., audio matching, identification of live audio, query-by-humming, identification of multiple pitches, and source separation). Efforts expended by a user in performing such audio processing may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 12:
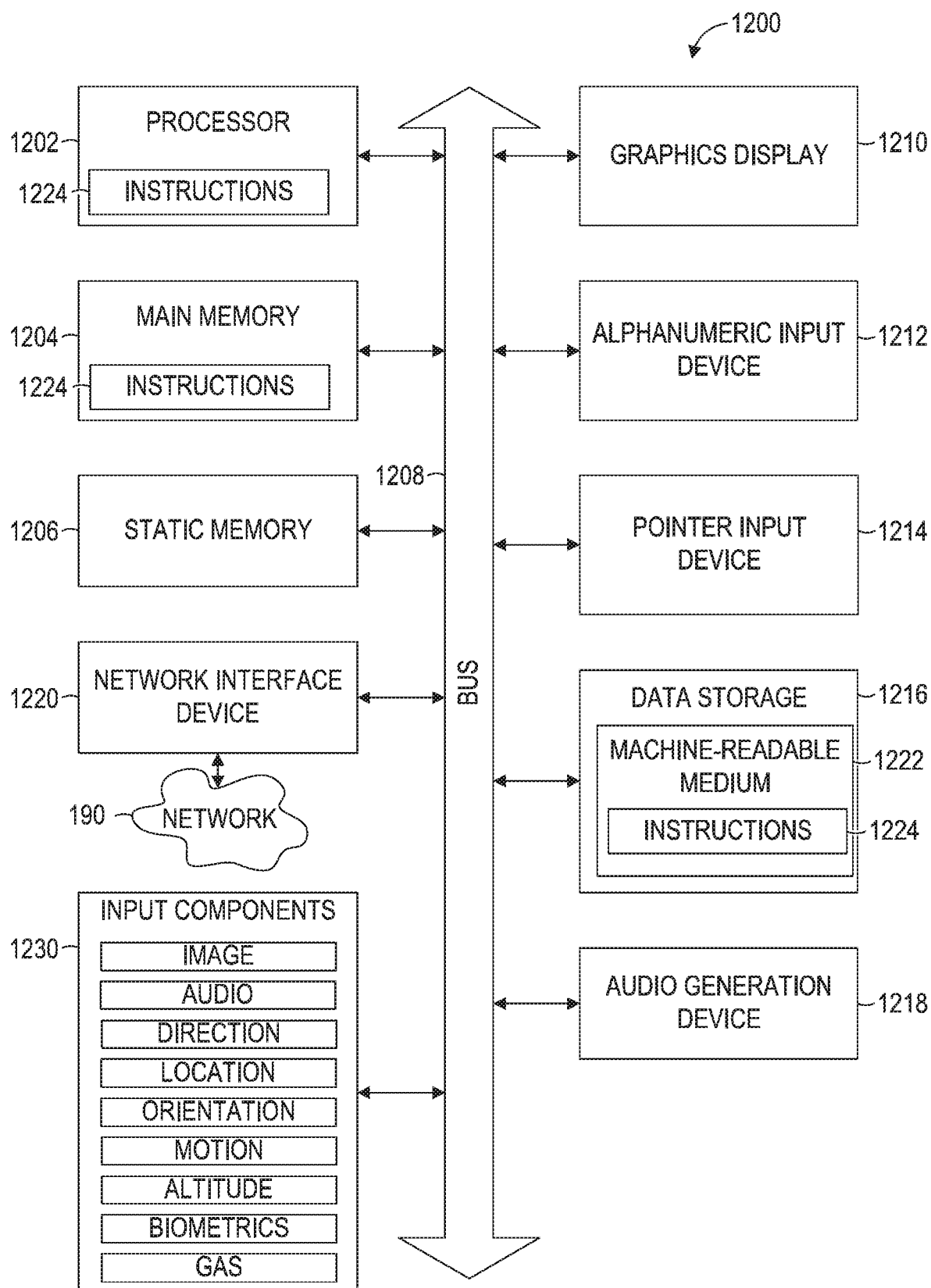
FIG. 12 is a block diagram illustrating components of a machine, according to some example embodiments, able to read instructions from a machine-readable medium and perform any one or more of the methodologies discussed herein.

FIG. 12 is a block diagram illustrating components of a machine 1200, according to some example embodiments, able to read instructions 1224 from a machine-readable medium 1222 (e.g., a non-transitory machine-readable medium, a machine-readable storage medium, a computer-readable storage medium, or any suitable combination thereof) and perform any one or more of the methodologies discussed herein, in whole or in part. Specifically, FIG. 12 shows the machine 1200 in the example form of a computer system (e.g., a computer) within which the instructions 1224 (e.g., software, a program, an application, an applet, an app, or other executable code) for causing the machine 1200 to perform any one or more of the methodologies discussed herein may be executed, in whole or in part.

In alternative embodiments, the machine 1200 operates as a standalone device or may be communicatively coupled (e.g., networked) to other machines. In a networked deployment, the machine 1200 may operate in the capacity of a server machine or a client machine in a server-client network environment, or as a peer machine in a distributed (e.g., peer-to-peer) network environment. The machine 1200 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1224, sequentially or otherwise, that specify actions to be taken by that machine. Further, while only a single machine is illustrated, the term "machine" shall also be taken to include any collection of machines that individually or jointly execute the instructions 1224 to perform all or part of any one or more of the methodologies discussed herein.

The machine 1200 includes a processor 1202 (e.g., one or more central processing units (CPUs), one or more GPUs, one or more digital signal processors (DSPs), one or more application specific integrated circuits (ASICs), one or more radio-frequency integrated circuits (RFICs), or any suitable combination thereof), a main memory 1204, and a static memory 1206, which are configured to communicate with each other via a bus 1208. The processor 1202 contains solid-state digital microcircuits (e.g., electronic, optical, or both) that are configurable, temporarily or permanently, by some or all of the instructions 1224 such that the processor 1202 is configurable to perform any one or more of the methodologies described herein, in whole or in part. For example, a set of one or more microcircuits of the processor 1202 may be configurable to execute one or more modules (e.g., software modules) described herein. In some example embodiments, the processor 1202 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 1200 with at least the processor 1202, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1200 may further include a graphics display 1210 (e.g., a plasma display panel (PDP), a light emitting diode (LED) display, a liquid crystal display (LCD), a projector, a cathode ray tube (CRT), or any other display capable of displaying graphics or video). The machine 1200 may also include an alphanumeric input device 1212 (e.g., a keyboard or keypad), a pointer input device 1214 (e.g., a mouse, a touchpad, a touchscreen, a trackball, a joystick, a stylus, a motion sensor, an eye tracking device, a data glove, or other pointing instrument), a data storage 1216, an audio generation device 1218 (e.g., a sound card, an amplifier, a speaker, a headphone jack, or any suitable combination thereof), and a network interface device 1220.

The data storage 1216 (e.g., a data storage device) includes the machine-readable medium 1222 (e.g., a tangible and non-transitory machine-readable storage medium) on which are stored the instructions 1224 embodying any one or more of the methodologies or functions described herein. The instructions 1224 may also reside, completely or at least partially, within the main memory 1204, within the static memory 1206, within the processor 1202 (e.g., within the processor's cache memory), or any suitable combination thereof, before or during execution thereof by the machine 1200. Accordingly, the main memory 1204, the static memory 1206, and the processor 1202 may be considered machine-readable media (e.g., tangible and non-transitory machine-readable media). The instructions 1224 may be transmitted or received over the network 190 via the network interface device 1220. For example, the network interface device 1220 may communicate the instructions 1224 using any one or more transfer protocols (e.g., hypertext transfer protocol (HTTP)).

In some example embodiments, the machine 1200 may be a portable computing device (e.g., a smart phone, a tablet computer, or a wearable device), and may have one or more additional input components 1230 (e.g., sensors or gauges). Examples of such input components 1230 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a biometric input component (e.g., a heartrate detector or a blood pressure detector), and a gas detection component (e.g., a gas sensor). Input data gathered by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1224 for execution by the machine 1200, such that the instructions 1224, when executed by one or more processors of the machine 1200 (e.g., processor 1202), cause the machine 1200 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 1224 for execution by the machine 1200 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1224).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments describe various example embodiments of methods, machine-readable media, and systems (e.g., machines, devices, or other apparatus) discussed herein.

A first embodiment provides a method comprising:
accessing, using one or more processors, audio data that represents query sound to be identified;
creating, using the one or more processors, a spectrogram of the audio data, different segments of the spectrogram representing amplitudes at frequencies in different time slices of the query sound;

determining, using the one or more processors, a dominant frequency in a time slice of the query sound based on a segment of the spectrogram, the determining including:
calculating an aggregate energy value of a candidate frequency based on amplitudes of the candidate frequency and harmonics thereof represented in the segment of the spectrogram; and
identifying the candidate frequency as the dominant frequency based on the aggregate energy value of the candidate frequency being a largest aggregate energy value among aggregate energy values of frequencies whose amplitudes are represented in the segment of the spectrogram;
creating, using the one or more processors, a query harmonogram of the audio data, different segments of the query harmonogram representing aggregate energy values of dominant frequencies in different time slices of the query sound; and
providing, using the one or more processors, an identifier of the query sound based on a comparison of the query harmonogram to a reference harmonogram mapped to the identifier by a database.

A second embodiment provides a method according to the first embodiment, wherein:
the creating of the query harmonogram includes indicating the aggregate energy value of the dominant frequency at a logarithm of the dominant frequency in a segment of the query harmonogram.

A third embodiment provides a method according to the first embodiment or the second embodiment, wherein:
the time slices of the query sound are between 10 and 30 milliseconds in duration; and
the frequencies represented in the spectrogram each represent a quarter tone.

A fourth embodiment provides a method according to any of the first through third embodiments, wherein:
the calculating of the aggregate energy value of the candidate frequency includes summing amplitudes of the candidate frequency and the harmonics thereof.

A fifth embodiment provides a method according to any of the first through fourth embodiments, wherein:
the calculating of the aggregate energy value of the candidate frequency includes calculating weighted amplitudes of the candidate frequency and the harmonics thereof and summing the weighted amplitudes.

A sixth embodiment provides a method according to any of the first through fifth embodiments, wherein:
the dominant frequency is a first most dominant frequency and indicates a strongest harmonic component of the time slice; and the method further comprises:
determining a second most dominant frequency that indicates a second strongest harmonic component of the time slice, the determining of the second most dominant frequency including:
calculating an aggregate energy value of a further candidate frequency based on amplitudes of the further candidate frequency and harmonics thereof represented in the segment of the spectrogram; and
identifying the further candidate frequency as the second most dominant frequency based on the aggregate energy value of the further candidate frequency being a second largest aggregate energy value among aggregate energy values of frequencies whose amplitudes are represented in the segment of the spectrogram; and wherein:
the creating of the query harmonogram includes indicating the aggregate energy values of the first and second most dominant frequencies in a same segment of the query harmonogram.

A seventh embodiment provides a method according to the sixth embodiment, wherein:
the second most dominant frequency and its harmonics are distinct from the first most dominant frequency and its harmonics in the segment of the spectrogram; and
the calculating of the aggregate energy value for the further candidate frequency is not based on any amplitudes of the first most dominant frequency and harmonics thereof represented in the segment of the spectrogram.

An eighth embodiment provides a method according to any of the first through seventh embodiments, further comprising:
generating a reference hash of the reference harmonogram; indexing the reference hash among multiple reference hashes of multiple reference harmonograms within the database; and
generating a query hash of the query harmonogram based on the query harmonogram; and wherein
the providing of the identifier of the query sound is based on a determination that the query hash of the query harmonogram matches the indexed reference hash of the reference harmonogram.

A ninth embodiment provides a method according to any of the first through eighth embodiments, further comprising:
removing the aggregate energy value of the dominant frequency from a segment of the query harmonogram based on a determination that a harmonic component indicated by the aggregate energy value is shorter than a threshold minimum duration within the query sound; and
the providing of the identifier of the query sound is based on the query harmonogram with the aggregate energy value removed.

A tenth embodiment provides a method according to any of the first through eighth embodiments, further comprising:
removing the aggregate energy value of the dominant frequency from a segment of the query harmonogram based on a determination that no adjacent segments of the query harmonogram contain aggregate energy values above a threshold minimum value within a threshold tolerance around the dominant frequency; and
the providing of the identifier of the query sound is based on the query harmonogram with the aggregate energy value removed.

An eleventh embodiment provides a method according to any of the first through eighth embodiments, further comprising:
modifying the query harmonogram by modifying the dominant frequency indicated by the aggregate energy value in a segment of the query harmonogram based on a neighboring aggregate energy value of a neighboring dominant frequency in a neighboring segment of the query harmonogram; and wherein
the providing of the identifier of the query sound is based on the modified query harmonogram.

A twelfth embodiment provides a method according to any of the first through eighth embodiments, further comprising:
modifying the query harmonogram by generating an additional aggregate energy value of an additional dominant frequency in the segment of the query harmonogram based on a determination that an adjacent segment of the query harmonogram contains an aggregate energy value above a minimum threshold value but with no counterpart above a threshold minimum value within a threshold tolerance around the dominant frequency; and wherein
the providing of the identifier of the query sound is based on the modified query harmonogram.

A thirteenth embodiment provides a method according to any of the first through twelfth embodiments, further comprising:
identifying a query pattern of energy peaks in the query harmonogram based on a threshold minimum energy value; and wherein
the comparison of the query harmonogram to the reference harmonogram includes a comparison of the query pattern of energy peaks to a reference pattern of energy peaks identified in the reference harmonogram.

A fourteenth embodiment provides a method according to the thirteenth embodiment, wherein:
the identifying of the query pattern of energy peaks in the query harmonogram is further based on a threshold minimum separation between peaks.

A fifteenth embodiment provides a method according to any of the first through fourteenth embodiments, wherein:
the creating of the spectrogram of the audio data creates a first two-dimensional array of amplitudes at frequencies over the time slices of the query sound, the created spectrogram being stored in the database as a first image; and
the creating of the query harmonogram of the audio data creates a second two-dimensional array of aggregate energy values at frequencies over the time slices of the query sound, the creative query harmonogram being stored in the database as a second image.

A sixteenth embodiment provides a method according to any of the first through fifteenth embodiments, wherein:
the creating of the spectrogram of the audio data includes performing a CQT of the audio data.

A seventeenth embodiment provides a machine-readable medium (e.g., a non-transitory machine-readable storage medium) or device (e.g., a storage device) comprising instructions that, when executed by one or more processors of a machine, cause the machine to perform operations comprising:
accessing audio data that represents query sound to be identified;
creating a spectrogram of the audio data, different segments of the spectrogram representing amplitudes at frequencies in different time slices of the query sound;
determining a dominant frequency in a time slice of the query sound based on a segment of the spectrogram, the determining including:
calculating an aggregate energy value of a candidate frequency based on amplitudes of the candidate frequency and harmonics thereof represented in the segment of the spectrogram; and
identifying the candidate frequency as the dominant frequency based on the aggregate energy value of the candidate frequency being a largest aggregate energy value among aggregate energy values of frequencies whose amplitudes are represented in the segment of the spectrogram;
creating a query harmonogram of the audio data, different segments of the query harmonogram representing aggregate energy values of dominant frequencies in different time slices of the query sound; and
providing an identifier of the query sound based on a comparison of the query harmonogram to a reference harmonogram mapped to the identifier by a database.

An eighteenth embodiment provides a machine-readable storage medium or device according to the seventeenth embodiment, wherein the operations further comprise:
generating a reference hash of the reference harmonogram;
indexing the reference hash among multiple reference hashes of multiple reference harmonograms within the database; and
generating a query hash of the query harmonogram based on the query harmonogram; and wherein
the providing of the identifier of the query sound is based on a determination that the query hash of the query harmonogram matches the indexed reference hash of the reference harmonogram.

A nineteenth embodiment provides a system comprising:
processors; and
a memory storing instructions that, when executed by at least one processor among the processors, causes the system to perform operations comprising:
accessing audio data that represents query sound to be identified;
creating a spectrogram of the audio data, different segments of the spectrogram representing amplitudes at frequencies in different time slices of the query sound;
determining a dominant frequency in a time slice of the query sound based on a segment of the spectrogram, the determining including:
calculating an aggregate energy value of a candidate frequency based on amplitudes of the candidate frequency and harmonics thereof represented in the segment of the spectrogram; and
identifying the candidate frequency as the dominant frequency based on the aggregate energy value of the candidate frequency being a largest aggregate energy value among aggregate energy values of frequencies whose amplitudes are represented in the segment of the spectrogram;
creating a query harmonogram of the audio data, different segments of the query harmonogram representing aggregate energy values of dominant frequencies in different time slices of the query sound; and
providing an identifier of the query sound based on a comparison of the query harmonogram to a reference harmonogram mapped to the identifier by a database.

A twentieth embodiment provides a system according to the nineteenth embodiment, wherein the operations further comprise:
generating a reference hash of the reference harmonogram;
indexing the reference hash among multiple reference hashes of multiple reference harmonograms within the database; and
generating a query hash of the query harmonogram based on the query harmonogram; and wherein
the providing of the identifier of the query sound is based on a determination that the query hash of the query harmonogram matches the indexed reference hash of the reference harmonogram.

A twenty first embodiment provides a carrier medium carrying machine-readable instructions for controlling (e.g., instructing) a machine to carry out the method of any one of the first through sixteenth embodiments.

What is claimed is:

1. An apparatus comprising:
accessing means to access audio data that represents query sound to be identified;
first creating means to create a spectrogram of the audio data, different segments of the spectrogram representing amplitudes at frequencies in different time slices of the query sound;
determining means to determine a dominant frequency in a time slice of the query sound based on a segment of the spectrogram, the determining means including:
calculating means to calculate an aggregate energy value of a candidate frequency based on amplitudes of the candidate frequency and harmonics thereof represented in the segment of the spectrogram; and identifying means to identify the candidate frequency as the dominant frequency based on the aggregate energy value of the candidate frequency being a largest aggregate energy value among aggregate energy values of frequencies whose amplitudes are represented in the segment of the spectrogram;

second creating means to create a query harmonogram of the audio data, different segments of the query harmonogram representing aggregate energy values of dominant frequencies in different time slices of the query sound; and providing means to provide an identifier of the query sound based on a comparison of the query harmonogram to a reference harmonogram mapped to the identifier by a database.

2. The apparatus of claim 1, wherein the second creating means is to indicate the aggregate energy value of the dominant frequency at a logarithm of the dominant frequency in a segment of the query harmonogram.

3. The apparatus of claim 1, wherein the time slices of the query sound are between 10 and 30 milliseconds in duration, and the frequencies represented in the spectrogram each represent a quarter tone.

4. The apparatus of claim 1, wherein the calculating means is to sum amplitudes of the candidate frequency and the harmonics thereof.

5. The apparatus of claim 1, wherein the calculating means is to calculate weighted amplitudes of the candidate frequency and the harmonics thereof and sum the weighted amplitudes.

6. The apparatus of claim 1, wherein the dominant frequency is a first most dominant frequency and indicates a strongest harmonic component of the time slice, and the determining means is to:

determine a second most dominant frequency that indicates a second strongest harmonic component of the time slice, the determining means including:

the calculating means to calculate an aggregate energy value of a further candidate frequency based on amplitudes of the further candidate frequency and harmonics thereof represented in the segment of the spectrogram; and the identifying means to identify the further candidate frequency as the second most dominant frequency based on the aggregate energy value of the further candidate frequency being a second largest aggregate energy value among aggregate energy values of frequencies whose amplitudes are represented in the segment of the spectrogram; and the second creating means is to create the query harmonogram by indicating the aggregate energy values of the first and second most dominant frequencies in a same segment of the query harmonogram.

7. The apparatus of claim 6, wherein the second most dominant frequency and its harmonics are distinct from the first most dominant frequency and its harmonics in the segment of the spectrogram, and the calculating means is to calculate the aggregate energy value for the further candidate frequency not based on any amplitudes of the first most dominant frequency and harmonics thereof represented in the segment of the spectrogram.

8. The apparatus of claim 1, further including:

generating means to generate a reference hash of the reference harmonogram;

indexing means to index the reference hash among multiple reference hashes of multiple reference harmonograms within the database; and the generating means to generate a query hash of the query harmonogram based on the query harmonogram; and the providing means is to provide the identifier of the query sound based on a determination that the query hash of the query harmonogram matches the indexed reference hash of the reference harmonogram.

9. The apparatus of claim 1, further including:

removing means for removing the aggregate energy value of the dominant frequency from a segment of the query harmonogram based on a determination that a harmonic component indicated by the aggregate energy value is shorter than a threshold minimum duration within the query sound; and the providing means is to provide the identifier of the query sound based on the query harmonogram with the aggregate energy value removed.

10. The apparatus of claim 1, further including:

removing means for removing the aggregate energy value of the dominant frequency from a segment of the query harmonogram based on a determination that no adjacent segments of the query harmonogram contain aggregate energy values above a threshold minimum value within a threshold tolerance around the dominant frequency; and the providing means is to provide the identifier of the query sound based on the query harmonogram with the aggregate energy value removed.

11. The apparatus of claim 1, further including:

modifying means for modifying the query harmonogram by modifying the dominant frequency indicated by the aggregate energy value in a segment of the query harmonogram based on a neighboring aggregate energy value of a neighboring dominant frequency in a neighboring segment of the query harmonogram; and the providing means is to provide the identifier of the query sound based on the modified query harmonogram.

12. The apparatus of claim 1, further including:

modifying means for modifying the query harmonogram by generating an additional aggregate energy value of an additional dominant frequency in the segment of the query harmonogram based on a determination that an adjacent segment of the query harmonogram contains an aggregate energy value above a minimum threshold value but with no counterpart above a threshold minimum value within a threshold tolerance around the dominant frequency; and the providing means is to provide the identifier of the query sound based on the modified query harmonogram.

13. The apparatus of claim 1, wherein the identifying means are first identifying means, and further including:

second identifying means for identifying a query pattern of energy peaks in the query harmonogram based on a threshold minimum energy value; and the providing means is to compare the query harmonogram to the reference harmonogram by comparing the query pattern of energy peaks to a reference pattern of energy peaks identified in the reference harmonogram.

14. The apparatus of claim 13, wherein:

the second identifying means is to identify the query pattern of energy peaks in the query harmonogram based on a threshold minimum separation between peaks.

15. The apparatus of claim 1, wherein:
the first creating means is to create the spectrogram of the audio data by creating a first two-dimensional array of amplitudes at frequencies over the time slices of the query sound, the created spectrogram being stored in the database as a first image; and
the second creating means is to create the query harmonogram of the audio data by creating a second two-dimensional array of aggregate energy values at frequencies over the time slices of the query sound, the created query harmonogram being stored in the database as a second image.

16. The apparatus of claim 1, wherein:
the first creating means is to create the spectrogram of the audio data by performing a Constant Q Transform (CQT) of the audio data.

17. A non-transitory machine-readable storage medium comprising instructions that, when executed, cause a machine to at least:
create a spectrogram of audio data that represents query sound to be identified;
determine a dominant frequency in a time slice of the query sound based on a segment of the spectrogram by:
calculating an aggregate energy value of a candidate frequency based on amplitudes and harmonics of the candidate frequency represented in the segment of the spectrogram; and
identifying the candidate frequency as the dominant frequency based on the aggregate energy value having a greatest aggregate energy value of the aggregate energy values of frequencies whose amplitudes are represented in the segment of the spectrogram;
create a query harmonogram of the audio data; and
provide an identifier of the query sound based on a comparison of the query harmonogram to a reference harmonogram mapped to the identifier by a database.

18. The non-transitory machine-readable storage medium of claim 17, wherein different segments of the spectrogram represent amplitudes at frequencies in different time slices of the query sound, and different segments of the query harmonogram represent aggregate energy values of dominant frequencies in different time slices of the query sound.

19. An apparatus comprising:
at least one processor; and
memory including instructions that, when executed, cause the at least one processor to:
create a spectrogram of audio data that represents query sound to be identified;
determine a dominant frequency in a time slice of the query sound based on a segment of the spectrogram by:
calculating an aggregate energy value of a candidate frequency based on amplitudes and harmonics of the candidate frequency represented in the segment of the spectrogram; and
identifying the candidate frequency as the dominant frequency based on the aggregate energy value having a greatest aggregate energy value of the aggregate energy values of frequencies whose amplitudes are represented in the segment of the spectrogram;
create a query harmonogram of the audio data; and
provide an identifier of the query sound based on a comparison of the query harmonogram to a reference harmonogram mapped to the identifier by a database.

20. The apparatus of claim 19, wherein different segments of the spectrogram represent amplitudes at frequencies in different time slices of the query sound, and different segments of the query harmonogram represent aggregate energy values of dominant frequencies in different time slices of the query sound.

* * * * *